(12) United States Patent
Kikuchi et al.

(10) Patent No.: US 8,421,967 B2
(45) Date of Patent: *Apr. 16, 2013

(54) LIQUID CRYSTAL DISPLAY DEVICE AND PROCESS FOR PRODUCING LIQUID CRYSTAL DISPLAY DEVICE

(75) Inventors: Tetsuo Kikuchi, Osaka (JP); Hideki Kitagawa, Osaka (JP); Hajime Imai, Osaka (JP); Yoshihito Hara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 517 days.

This patent is subject to a terminal disclaimer.

(21) Appl. No.: 12/518,719

(22) PCT Filed: Oct. 25, 2007

(86) PCT No.: PCT/JP2007/070829
§ 371 (c)(1),
(2), (4) Date: Jun. 11, 2009

(87) PCT Pub. No.: WO2008/072423
PCT Pub. Date: Jun. 19, 2008

(65) Prior Publication Data
US 2010/0014031 A1    Jan. 21, 2010

(30) Foreign Application Priority Data
Dec. 14, 2006 (JP) ................ 2006-337029

(51) Int. Cl.
*G02F 1/1335* (2006.01)
(52) U.S. Cl.
USPC ............. 349/113; 349/114; 349/138; 445/58
(58) Field of Classification Search .................. 349/113, 349/114; 445/58
See application file for complete search history.

(56) References Cited

U.S. PATENT DOCUMENTS
4,345,249 A  8/1982  Togashi
4,519,678 A  5/1985  Komatsubara et al.
(Continued)

FOREIGN PATENT DOCUMENTS
EP  1 744 204 A1  1/2007
JP  63-296004     12/1988
(Continued)

OTHER PUBLICATIONS
International Search Report for PCT/JP2007/070829, mailed Nov. 27, 2007.
(Continued)

*Primary Examiner* — Edward Glick
*Assistant Examiner* — Sang V Nguyen
(74) *Attorney, Agent, or Firm* — Nixon & Vanderhye P.C.

(57) ABSTRACT

Transflective-type and reflection-type liquid crystal display devices having a high image quality are provided at low cost. A liquid crystal display device according to the present invention is a liquid crystal display device having a reflection region for reflecting incident light toward a display surface, the reflection region including a Cs metal layer (metal layer), a gate insulating layer formed on the Cs metal layer, a semiconductor layer formed on the gate insulating layer, and a reflective layer formed on the semiconductor layer. On the surface of the reflective layer, a first recess and a second recess located inside the first recess are formed. The Cs metal layer and the semiconductor layer each have an aperture, and one of the first recess and the second recess is constituted by the aperture of the Cs metal layer, and the other is constituted by the aperture of the semiconductor layer.

1 Claim, 21 Drawing Sheets

U.S. PATENT DOCUMENTS

| | | | |
|---|---|---|---|
| 5,408,345 | A | 4/1995 | Mitsui et al. |
| 5,418,635 | A | 5/1995 | Mitsui et al. |
| 5,508,834 | A | 4/1996 | Yamada et al. |
| 5,811,835 | A | 9/1998 | Seiki et al. |
| 6,208,395 | B1 * | 3/2001 | Kanoh et al. .................. 349/113 |
| 6,255,706 | B1 * | 7/2001 | Watanabe et al. ............. 257/412 |
| 6,287,899 | B1 | 9/2001 | Park et al. |
| 6,330,047 | B1 | 12/2001 | Kubo et al. |
| 6,407,784 | B1 | 6/2002 | Kamou et al. |
| 6,468,822 | B2 * | 10/2002 | Maeda et al. .................... 438/30 |
| 6,573,127 | B2 * | 6/2003 | Seo ............... 438/149 |
| 6,661,488 | B1 | 12/2003 | Takeda et al. |
| 6,710,825 | B2 | 3/2004 | Kubo et al. |
| 6,747,289 | B2 | 6/2004 | Yamazaki et al. |
| 6,771,346 | B2 | 8/2004 | Sugimoto et al. |
| 6,839,107 | B2 * | 1/2005 | Kobashi ........................ 349/113 |
| 6,839,108 | B1 | 1/2005 | Hirakata et al. |
| 6,873,384 | B2 | 3/2005 | Yamanaka et al. |
| 6,900,084 | B1 * | 5/2005 | Yamazaki ..................... 438/158 |
| 6,967,702 | B2 | 11/2005 | Ishii et al. |
| 6,992,718 | B1 | 1/2006 | Takahara |
| 7,102,712 | B2 | 9/2006 | Anno et al. |
| 7,375,781 | B2 | 5/2008 | Kubo |
| 7,525,614 | B2 | 4/2009 | Jeong et al. |
| 7,554,631 | B2 | 6/2009 | Tashiro et al. |
| 7,768,603 | B2 | 8/2010 | Tasaka et al. |
| 2002/0018161 | A1 | 2/2002 | Yamanaka et al. |
| 2002/0022364 | A1 | 2/2002 | Hatta et al. |
| 2002/0054259 | A1 | 5/2002 | Funahata et al. |
| 2002/0054269 | A1 | 5/2002 | Maeda et al. |
| 2002/0080320 | A1 | 6/2002 | Suzuki et al. |
| 2002/0149728 | A1 | 10/2002 | Ogishima et al. |
| 2003/0089949 | A1 | 5/2003 | Lin et al. |
| 2003/0112213 | A1 | 6/2003 | Noguchi et al. |
| 2003/0123005 | A1 | 7/2003 | Liu et al. |
| 2003/0142255 | A1 | 7/2003 | Ishii et al. |
| 2003/0186478 | A1 | 10/2003 | Morita et al. |
| 2003/0231267 | A1 | 12/2003 | Murai et al. |
| 2004/0027702 | A1 | 2/2004 | Matsushita et al. |
| 2004/0070714 | A1 | 4/2004 | Ishii et al. |
| 2005/0122452 | A1 * | 6/2005 | Yoshida et al. ............... 349/114 |
| 2005/0190322 | A1 | 9/2005 | Okabe et al. |
| 2005/0205870 | A1 | 9/2005 | Yamazaki |
| 2005/0270447 | A1 * | 12/2005 | Tasaka et al. ................. 349/113 |
| 2006/0038955 | A1 * | 2/2006 | Kim et al. ..................... 349/158 |
| 2006/0055852 | A1 | 3/2006 | Yoshida et al. |
| 2006/0139526 | A1 * | 6/2006 | Ahn et al. ..................... 349/114 |
| 2007/0001171 | A1 | 1/2007 | Yamazaki |
| 2007/0146591 | A1 | 6/2007 | Kimura et al. |
| 2007/0291200 | A1 | 12/2007 | Tashiro et al. |
| 2008/0002079 | A1 | 1/2008 | Kimura |
| 2009/0185119 | A1 | 7/2009 | Kikuchi et al. |
| 2009/0195740 | A1 | 8/2009 | Imai et al. |
| 2010/0045885 | A1 | 2/2010 | Imai et al. |
| 2010/0053517 | A1 | 3/2010 | Imai et al. |
| 2010/0118238 | A1 | 5/2010 | Shimada et al. |
| 2010/0182527 | A1 | 7/2010 | Kikiuchi et al. |
| 2010/0315578 | A1 | 12/2010 | Hara et al. |
| 2010/0321618 | A1 | 12/2010 | Imai et al. |

FOREIGN PATENT DOCUMENTS

| | | | |
|---|---|---|---|
| JP | 02-149802 | | 6/1990 |
| JP | 4-372934 | | 12/1992 |
| JP | 5-333328 | | 12/1993 |
| JP | 6-331831 | | 12/1994 |
| JP | 8-190089 | | 7/1996 |
| JP | 9-54318 | A | 2/1997 |
| JP | 10-325953 | | 12/1998 |
| JP | 11-109390 | | 4/1999 |
| JP | 11-237625 | A | 8/1999 |
| JP | 11-295697 | | 10/1999 |
| JP | 11-337961 | | 12/1999 |
| JP | 2000-010124 | | 1/2000 |
| JP | 2000-208773 | * | 7/2000 |
| JP | 2000-329906 | | 11/2000 |
| JP | 2001-201619 | | 7/2001 |
| JP | 2001-337323 | | 12/2001 |
| JP | 2002-236283 | | 8/2002 |
| JP | 2003-297850 | A | 10/2003 |
| JP | 2004-258366 | | 9/2004 |
| JP | 2004-264653 | | 9/2004 |
| JP | 2004-325503 | | 11/2004 |
| JP | 2005-157105 | A | 6/2005 |
| JP | 2005-195733 | | 7/2005 |
| JP | 2005-208553 | | 8/2005 |
| JP | 2005-313638 | | 11/2005 |
| JP | 2006-098525 | A | 4/2006 |
| JP | 2006-184673 | | 7/2006 |
| JP | 2006-220711 | | 8/2006 |
| JP | 2006-220922 | | 8/2006 |
| JP | 2007-101843 | | 4/2007 |
| JP | 2007-329099 | | 12/2007 |
| JP | 2008-242307 | A | 10/2008 |

OTHER PUBLICATIONS

U.S. Appl. No. 12/306,959, filed Dec. 30, 2008, Yoshihito Hara et al.
U.S. Appl. No. 12/446,071, filed Apr. 17, 2009, Yoshihito Hara et al.
U.S. Appl. No. 12/446,099, filed Apr. 17, 2009, Yoshihito Hara et al.
English translation of the International Preliminary Report on Patentability mailed Jun. 25, 2009 in corresponding PCT Application No. PCT/JP2007/070829.
U.S. Notice of Allowance mailed Mar. 23, 2011 in U.S. Appl. No. 12/446,099.
International Search Report for PCT/JP2007/070160, mailed Nov. 27, 2007.
English International Preliminary Report on Patentability mailed Nov. 27, 2008 in PCT Application No. PCT/JP2007/057675.
U.S. Office Action mailed Aug. 3, 2011 in U.S. Appl. No. 12/446,071.
Supplementary EP Search Report mailed Sep. 23, 2010 in EP application 07806943.2.
English translation of the International Preliminary Report on Patentability mailed Aug. 6, 2009 in PCT Application No. PCT/JP2007/073557.
International Search Report for PCT/JP2007/073557, mailed Jan. 15, 2008.
International Search Report for PCT/JP2007/067511, mailed Oct. 9, 2007.
International Search Report mailed Jan. 29, 2008 in PCT application PCT/JP 2007/073787.
International Search Report mailed Apr. 8, 2008 in PCT application PCT/JP/2007/075147.
English translation of the International Preliminary Report on Patentability mailed Aug. 13, 2009 in PCT Application No. PCT/JP2007/073787.
English International Preliminary Report on Patentability mailed Jan. 21, 2010 in PCT Application No. PCT/JP2008/001353.
English International Preliminary Report on Patentability mailed Oct. 22, 2009 in PCT Application No. PCT/JP2007/075147.
Supplementary EP Search Report mailed Dec. 17, 2010 in EP application 07860369.3.
Supplementary EP Search Report mailed Mar. 3, 2010 in EP application 07850173.1.
English International Preliminary Report on Patentability mailed Nov. 27, 2008 in PCT Application No. PCT/JP2007/057674.
International Search Report mailed Jul. 3, 2007 in PCT application PCT/JP2007/057674.
International Search Report mailed Jul. 3, 2007 in PCT application PCT/JP2007/057675.
International Search Report mailed Aug. 21, 2007 in PCT application PCT/JP 2007/061632.
International Search Report mailed Jul. 8, 2008 in PCT application PCT/JP/2008/001353.
English International Preliminary Report on Patentability mailed Jan. 29, 2009 in PCT Application No. PCT/JP2007/061632.
English translation of International Preliminary Report on Patentability mailed Apr. 30, 2009 in corresponding PCT Application No. PCT/JP2007/070160.
English translation of International Preliminary Report on Patentability mailed Apr. 30, 2009 in corresponding PCT Application No. PCT/JP2007/067511.

* cited by examiner

FIG.2
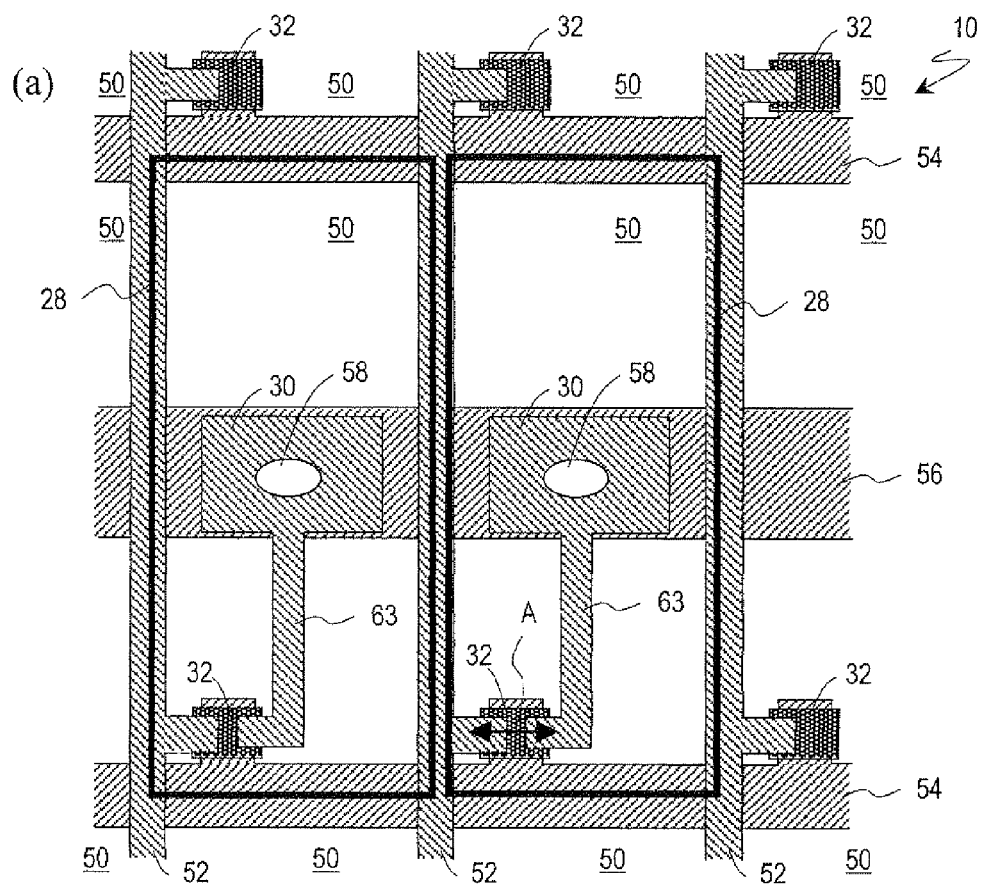
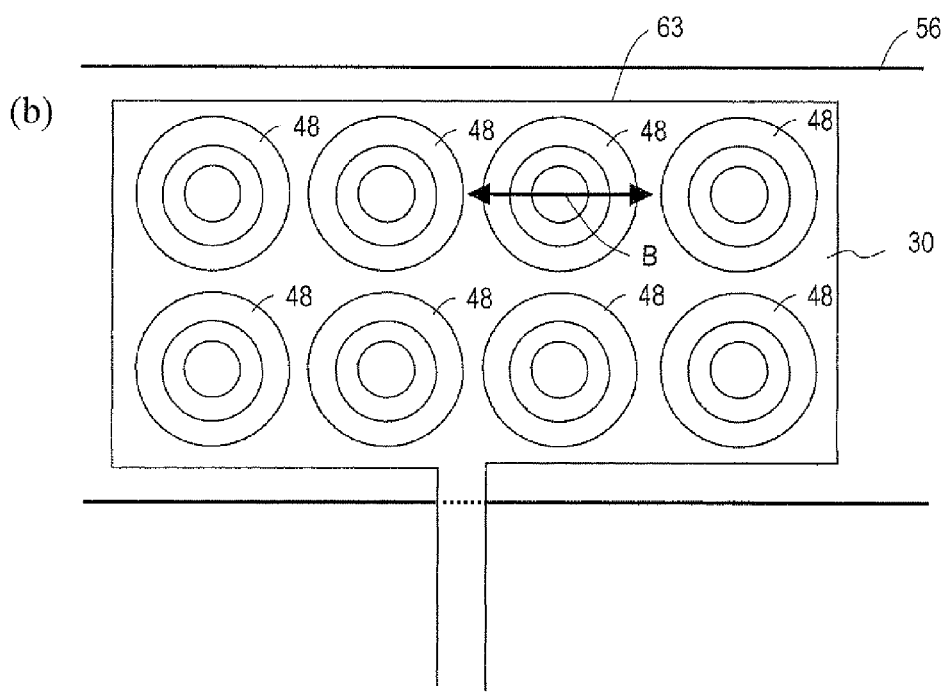

FIG.3
(a)
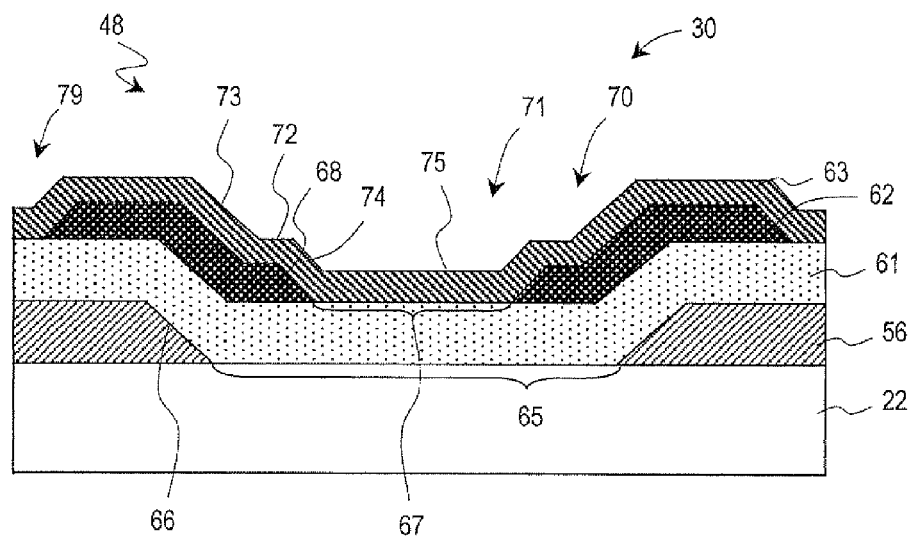
(b)
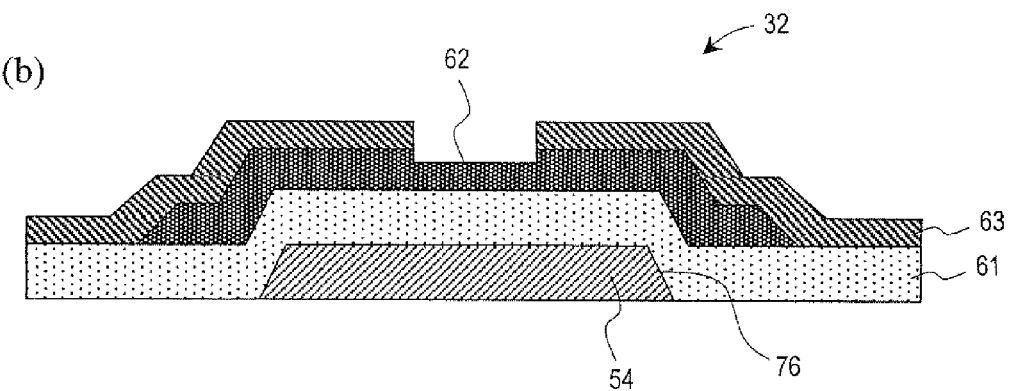

*FIG.4*
(a)
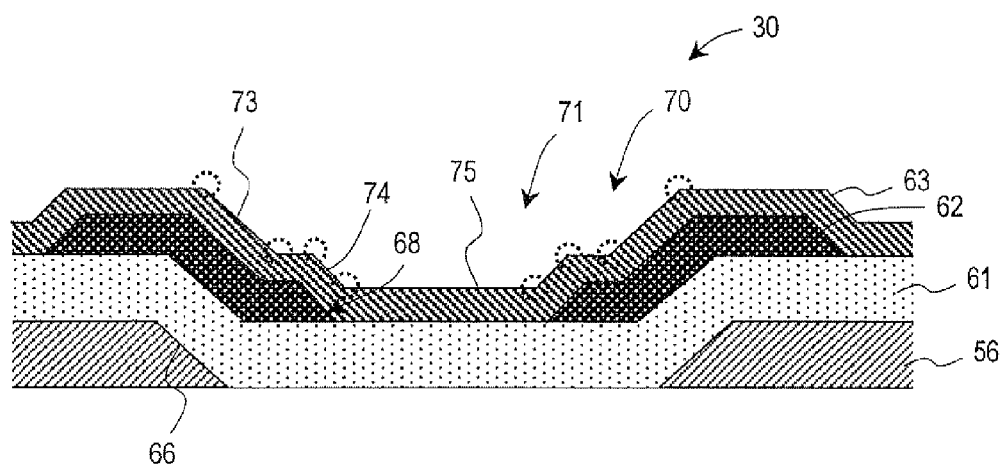
(b)
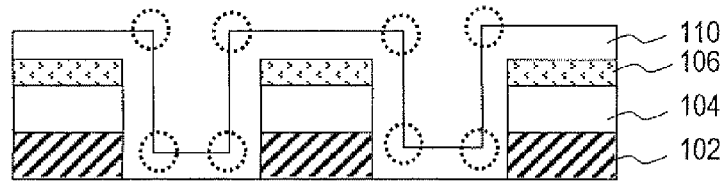
(c)
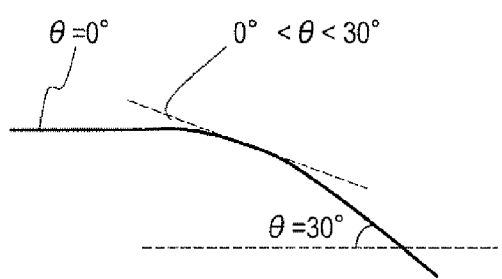

FIG.6
(a)
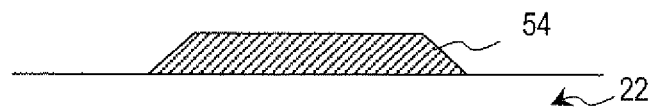
(b)
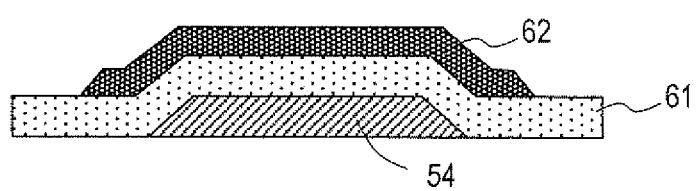
(c)
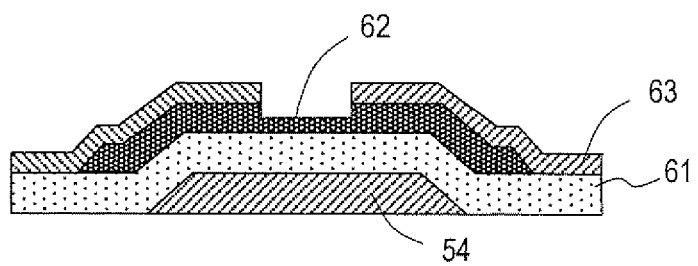
(d)
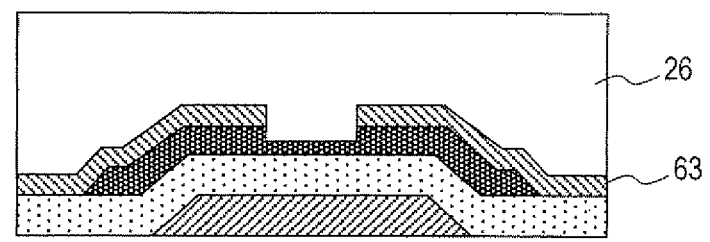
(e)
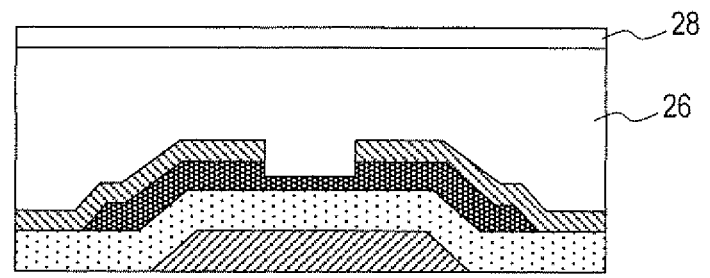

FIG.8
(a) 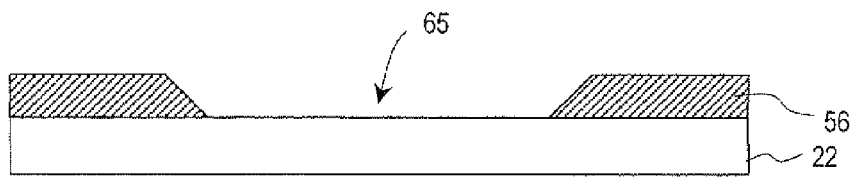
(b) 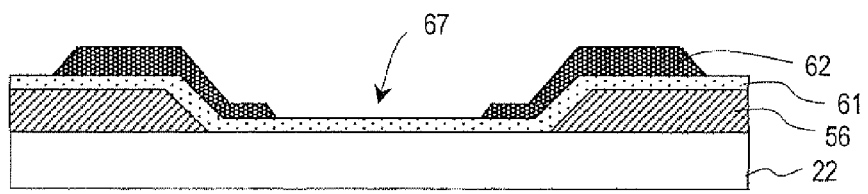
(c) 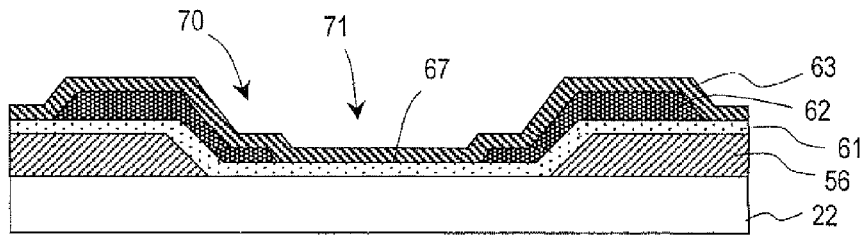
(d) 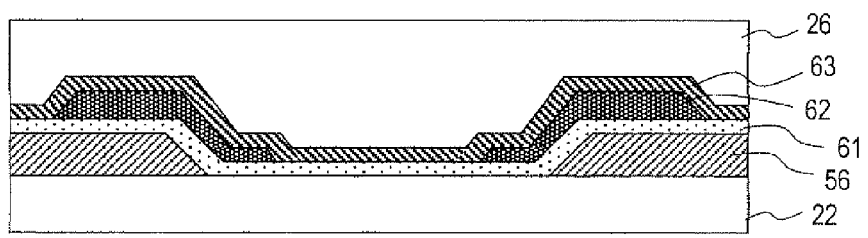
(e) 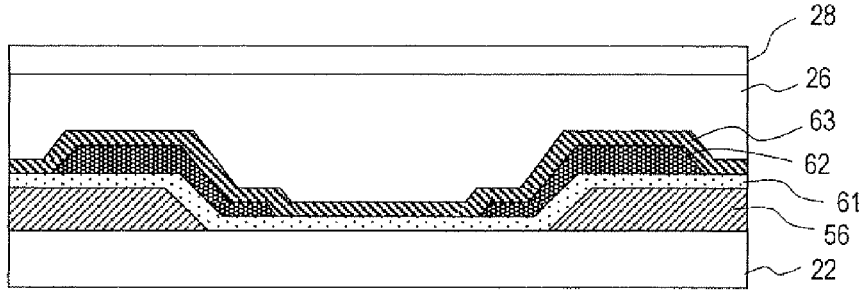

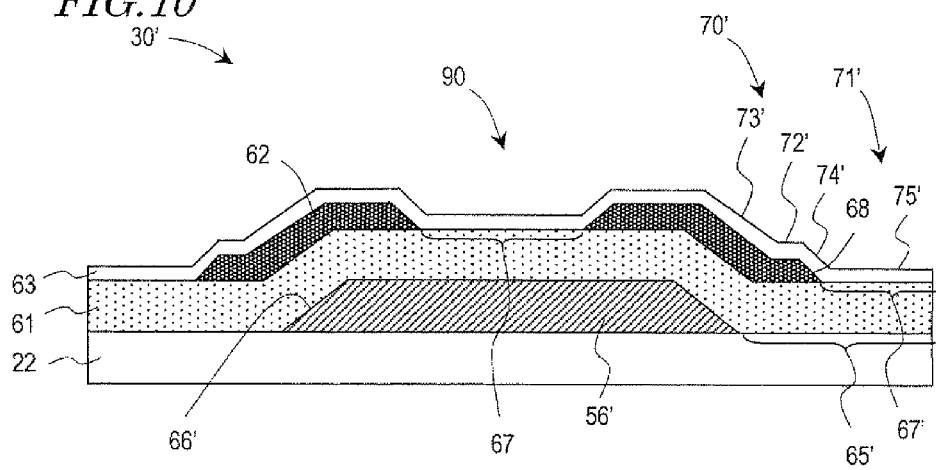
FIG.10
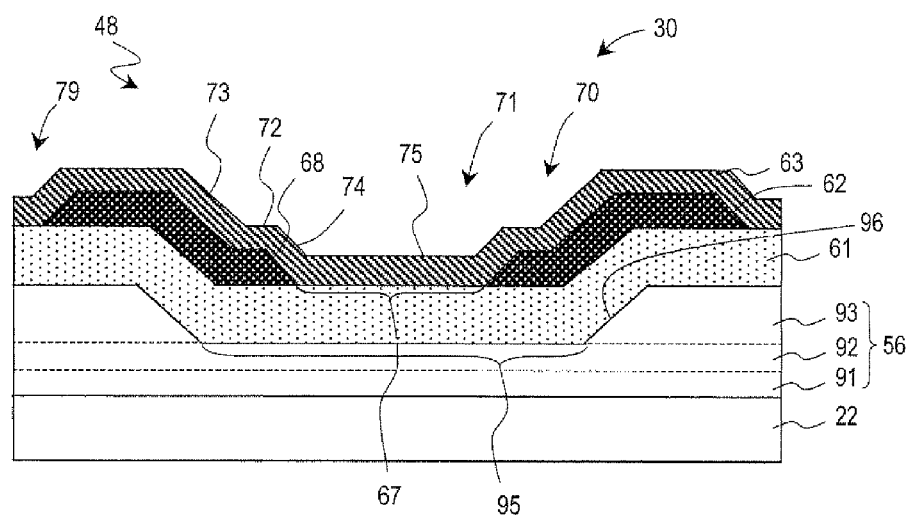
FIG.11
(a)
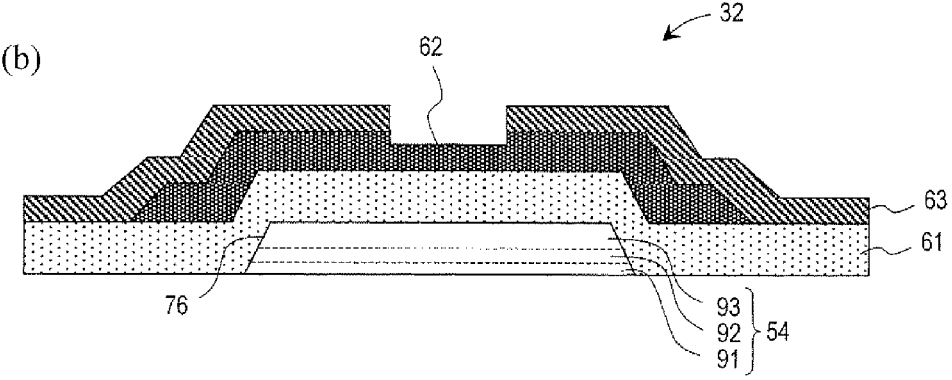
(b)

FIG.16
(a) 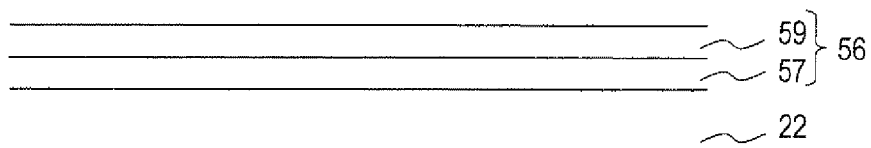
(b) 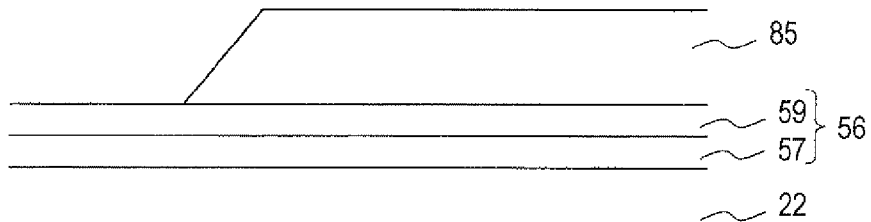
(c) 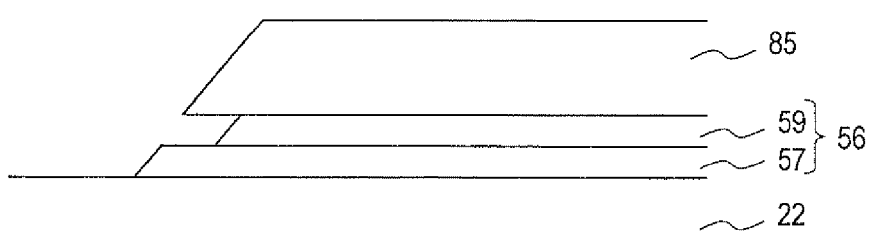
(d) 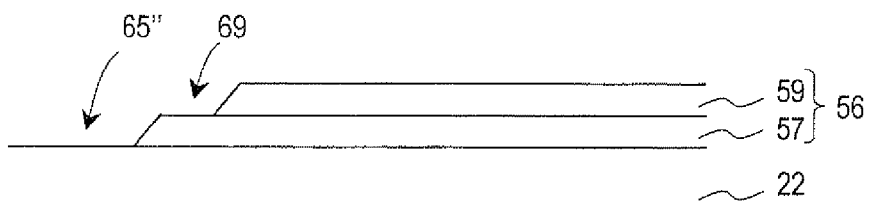

FIG.18
(a) 
(b) 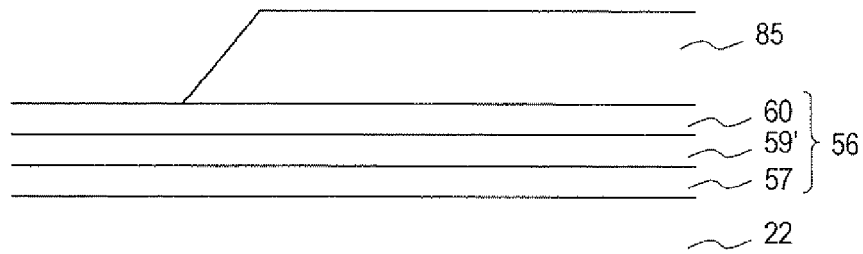
(c) 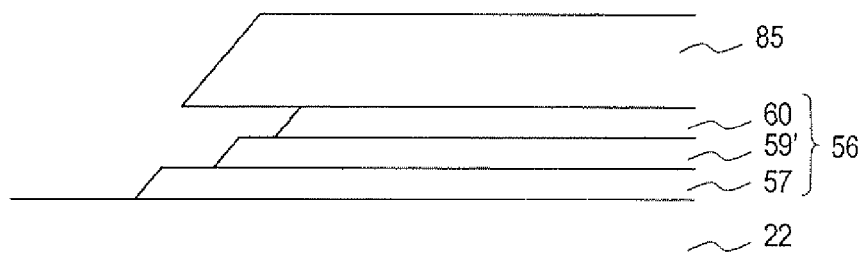
(d) 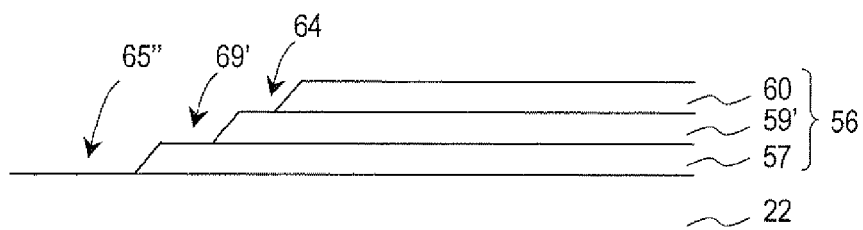

FIG.20
(a)
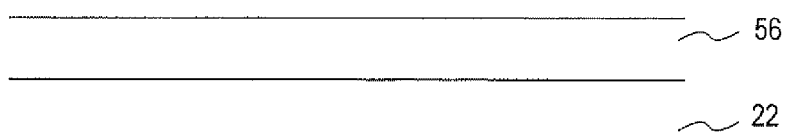
(b)
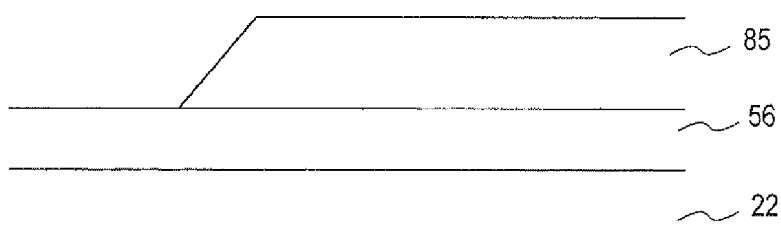
(c)
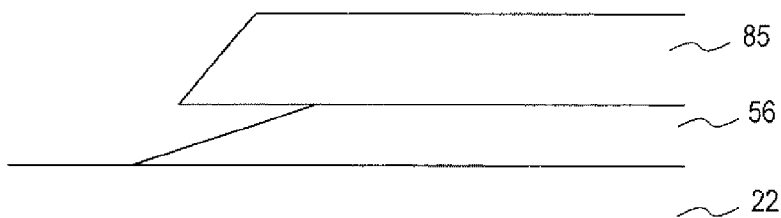
(d)
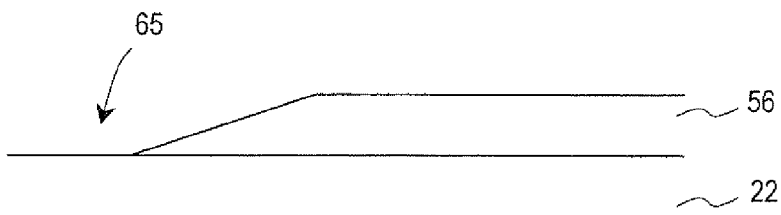

FIG.24
(a)
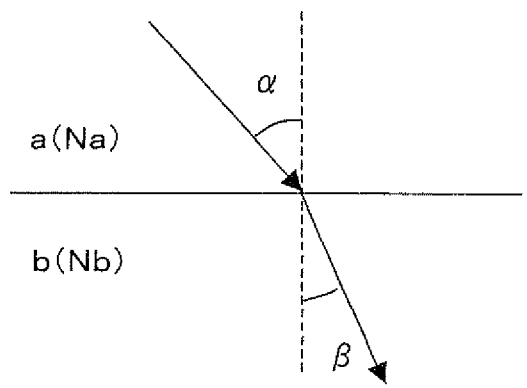
(b)
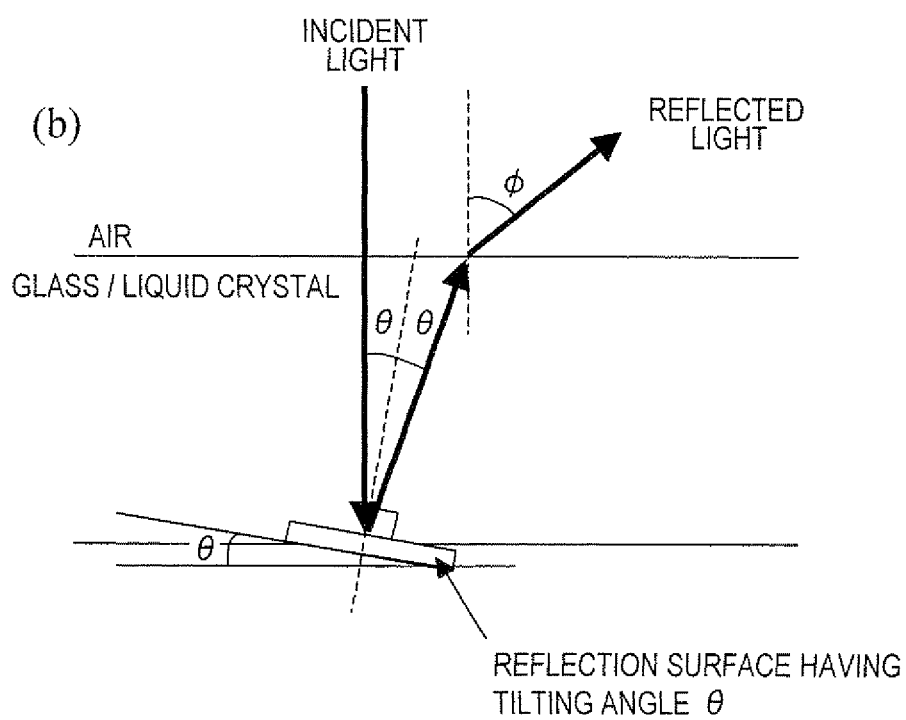

LIQUID CRYSTAL DISPLAY DEVICE AND PROCESS FOR PRODUCING LIQUID CRYSTAL DISPLAY DEVICE

This application is the U.S. national phase of International Application No. PCT/JP2007/070829 filed 25 Oct. 2007, which designated the U.S. and claims priority to Japan Application No. 2006-337029 filed 14 Dec. 2006, the entire contents of each of which are hereby incorporated by reference.

TECHNICAL FIELD

The present invention relates to a reflection-type or transflective-type liquid crystal display device which performs display by utilizing reflected light.

BACKGROUND ART

Liquid crystal display devices include the transmission-type liquid crystal display device which utilizes backlight from behind the display panel as a light source for displaying, the reflection-type liquid crystal display device which utilizes external light, and the transflective-type liquid crystal display device (reflection/transmission-type liquid crystal display device) which utilizes both external light and backlight. The reflection-type liquid crystal display device and the transflective-type liquid crystal display device are characterized in that they have smaller power consumptions than that of the transmission-type liquid crystal display device, and their displayed images are easy to see in a bright place. The transflective-type liquid crystal display device is characterized in that their displaying is easier to see than that of the reflection-type liquid crystal display device, even in a dark place.

FIG. 22 is a cross-sectional view of an active matrix substrate 100 in a conventional reflection-type liquid crystal display device (e.g., Patent Document 1).

As show in FIG. 22, the active matrix substrate 100 includes an insulative substrate 101, as well as a gate layer 102, a gate insulating layer 104, a semiconductor layer 106, a metal layer 108, and a reflective layer 110, which are stacked on the insulative substrate 101. After being stacked on the insulative substrate 101, the gate layer 102, the gate insulating layer 104, the semiconductor layer 106, and the metal layer 108 are subjected to etching by using one mask, thus being formed so as to have an island-like multilayer structure. Thereafter, the reflective layer 110 is formed on this multilayer structure, whereby ruggednesses as shown in the figure are formed on the surface of the reflective layer 110. Although not shown, transparent electrodes, a liquid crystal layer, a color filter substrate (CF substrate), and the like are formed above the active matrix substrate 100.

FIG. 23 is a cross-sectional view of a conventional transflective-type liquid crystal display device (e.g., Patent Document 2).

As shown in FIG. 23, in the conventional transflective-type liquid crystal display device, an interlayer insulating film 204 is formed on a drain electrode 222 of a switching element (TFT) 203, and a galvanic corrosion preventing film 205, a reflection electrode film 206, and an amorphous transparent electrode film 218 are stacked on the interlayer insulating film 204. The region where the reflection electrode film 206 is formed is a reflection region of the transflective-type liquid crystal display device. Ruggednesses are formed in an upper portion of the interlayer insulating film 204 within the reflection region, and conforming to these ruggednesses, ruggednesses are also formed on the galvanic corrosion preventing film 205, the reflection electrode film 206, and the amorphous transparent electrode film 218.

[Patent Document 1] Japanese Laid-Open Patent Publication No. 9-54318
[Patent Document 2] Japanese Laid-Open Patent Publication No. 2005-277402

DISCLOSURE OF INVENTION

Problems to be Solved by the Invention

In the aforementioned conventional active matrix substrate 100, portions of the reflective layer 110 are formed so as to reach the insulative substrate 101 in portions where the gate layer 102 and the like are not formed (i.e., portions between the islands, hereinafter referred to as "gap portions"). Therefore, in the gap portions, the surface of the reflection surface 112 is recessed toward the plane of the insulative substrate 101, thus forming deep dents (or recesses).

In the reflection-type or transflective-type liquid crystal display device, in order to perform bright display by utilizing reflected light, it is necessary to allow light entering from various directions to be reflected by the reflection surface of the reflective layer more uniformly and efficiently across a broad angle range. For this purpose, it is better if the reflection surface has moderate ruggednesses rather than being a complete plane.

However, the reflection surface 112 of the aforementioned active matrix substrate 100 has deep dents. Therefore, light is unlikely to reach the reflection surface located in lower portions of the dents, and even if at all light reaches there, the reflected light thereof is unlikely to be reflected toward the viewer because a large part of the reflection surface 112 has a large angle with respect to the display surface. Thus, the conventional liquid crystal display device has a problem in that the reflected light is not effectively used for displaying.

FIG. 14 is a diagram showing a relationship between the tilt of the reflection surface 112 and reflected light. FIG. 14(a) shows a relationship between an incident angle α and an outgoing angle β when light enters a medium b having a refractive index Nb from a medium a having a refractive index Na. In this case, according to Snell's Law, the following relationship holds true.

$$Na \times \sin\alpha = Nb \times \sin\beta$$

FIG. 24(b) is a diagram showing a relationship between incident light and reflected light when incident light perpendicularly entering the display surface of a liquid crystal display device is reflected from a reflection surface which is tilted by θ with respect to the display surface (or the substrate). As shown in the figure, the incident light perpendicularly entering the display surface is reflected from the reflection surface which is tilted by angle θ with respect to the display surface, and goes out in a direction of an outgoing angle φ.

Results of calculating the outgoing angle φ according to Snell's Law with respect to each angle θ of the reflection surface are shown in Table 1.

TABLE 1

| θ | φ | 90 − φ |
|---|---|---|
| 0 | 0 | 90 |
| 2 | 6.006121 | 83.99388 |
| 4 | 12.04967 | 77.95033 |
| 6 | 18.17181 | 71.82819 |

TABLE 1-continued

| θ | φ | 90 − φ |
|---|---|---|
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1 when the angle θ of the reflection surface exceeds 20 degrees, the outgoing angle φ becomes very large (i.e., 90−φ) becomes very small), so that most of the outgoing light does not reach the user. Therefore, even if ruggednesses are provided on the reflection surface, it does not necessarily mean that a lot of reflected light will be effectively used. In order to utilize reflected light more effectively, it is necessary to form more faces with an angle θ of 20 degrees or less within the reflection surface.

Since the reflection surface 112 of the conventional active matrix substrate 100 has many portions whose angles with respect to the display surface are greater than 20 degrees, reflected light is not very effectively used for displaying. In order to solve this problem, it might be possible to further form an insulating layer under the reflective layer 110 to bury the dents, thus Forming a relatively smooth reflection surface. However, in this case, a step of forming an insulating layer, a step of forming contact holes for connecting the reflective layer 110 to the drains of the TFTs in the insulating layer, and the like are needed, thus resulting in a problem of an increase in the material and the number of steps.

Moreover, in the aforementioned conventional transflective-type liquid crystal display device, after stacking the interlayer insulating film 204 on the drain electrode 222, a step of forming ruggednesses in an upper portion thereof is needed, and a step of stacking the galvanic corrosion preventing film 205, the reflection electrode film 206, and the amorphous transparent electrode film 218 further thereupon is needed. Thus, the conventional transflective-type liquid crystal display device also has a problem in that the material and number of steps are increased for forming the reflection region.

Furthermore, in a conventional transflective-type liquid crystal display device, ruggednesses are formed on the surface of the amorphous transparent electrode film 218, which is in contact with the liquid crystal layer 211, and therefore the cell gap of the liquid crystal layer 211 and the electric field applied across the liquid crystal layer 211 are not uniform, thus making it difficult to uniformly control the liquid crystal orientation in a desired direction in the reflection region. Moreover, although a slope which conforms to the end shape of the interlayer insulating film 204 is formed at an end of the amorphous transparent electrode film 218, there is also a problem in that this slope disturbs the orientation of the liquid crystal near the end of the reflection region.

The present invention has been made in view of the above problems, and an objective thereof is to provide a low-cost reflection-type or transflective-type liquid crystal display device having a high image quality.

Means for Solving the Problems

A liquid crystal display device according to the present invention is a liquid crystal display device comprising a reflection region for reflecting incident light toward a display surface, wherein, the reflection region includes a metal Layer, an insulating layer formed on the metal layer, a semiconductor layer formed on the insulating layer, and a reflective layer formed on the semiconductor layer; a first recess and a second recess located inside the first recess are formed on a surface of the reflective layer in the reflection region; the metal layer has an aperture or a recess; the semiconductor layer has an aperture; and one of the first recess and the second recess is formed according to the aperture or recess of the metal layer, and the other of the first recess and the second recess is formed according to the aperture of the semiconductor layer.

One embodiment comprises a semiconductor region where a semiconductor device including a gate layer is formed, wherein a tilting angle of a side face of the gate layer with respect to the display surface is larger than a tilting angle of a side face of the aperture or recess of the metal layer with respect to the display surface.

In one embodiment, on the surface of the reflective layer inside the first recess but outside the second recess, a flat surface which is generally parallel to the display surface is formed.

In one embodiment, a side face of the aperture or recess of the metal layer includes a face whose tilting angle with respect to the display surface is 20 degrees or less.

In one embodiment, an average tilting angle of a side face of the aperture or recess of the metal layer with respect to the display surface is 20 degrees or less.

In one embodiment, a depth of the aperture of the metal layer is no less than 50 nm and no more than 1000 nm, and a width of the side face of the aperture of the metal layer as seen from a perpendicular direction with respect to the display surface is no less than 100 nm and no more than 4000 nm.

In one embodiment, a depth of the recess of the metal layer is no less than 20 nm and no more than 1000 nm, and a width of the side face of the recess of the metal layer as seen from a perpendicular direction with respect to the display surface is no less than 100 nm and no more than 4000 nm.

In one embodiment, the metal layer includes a first layer and a second layer formed on the first layer, the second layer being made of a material different from that of the first layer; and a bottom face of the recess of the metal layer is formed of the first layer.

In one embodiment, the first layer is made of aluminum, and the second layer is made of titanium or titanium nitride.

In one embodiment, the metal layer is formed by a photolithography and etching using halftone exposure, and the gate layer is formed by a photolithography and etching not using halftone exposure.

In one embodiment, a third recess which is located inside the first recess is formed on the surface of the reflective layer.

In one embodiment, the third recess is formed according to an opening or recess which is formed inside the recess of the metal layer.

In one embodiment, the metal layer has a plurality of apertures or recesses.

One embodiment comprises: a liquid crystal layer, and an interlayer insulating layer and a pixel electrode interposed between the liquid crystal layer and the reflective layer, wherein a face of the pixel electrode facing the liquid crystal layer is formed flat without conforming to shapes of the first recess and the second recess of the reflective layer.

In one embodiment, the metal layer includes a first metal layer and a second metal layer formed on the first metal layer, the second metal layer being made of a material different from that of the first metal layer; the first metal layer and the second metal layer each have an aperture; and the aperture of the first metal layer is formed inside the aperture of the second metal layer.

In one embodiment, the first metal layer is made of aluminum, and the second metal layer is made of molybdenum.

In one embodiment, the metal layer includes a third metal layer formed on the second metal layer, the third metal layer being made of a material different from those of the first metal layer and the second metal layer; the third metal layer has an aperture; and the aperture of the second metal layer is formed inside the aperture of the third metal layer.

In one embodiment, the first metal layer is made of aluminum; the second metal layer is made of molybdenum nitride; and the third metal layer is made of molybdenum.

In one embodiment, the metal layer has a composition which varies along a thickness direction of the metal layer.

In one embodiment, the metal layer is made of molybdenum nitride, and a nitrogen content in the molybdenum nitride of the metal layer decreases toward the insulating layer.

A production method for a liquid crystal display device according to the present invention is a production method for a liquid crystal display device having a reflection region for reflecting incident light toward a display surface, comprising the steps of: forming a metal layer having an aperture or a recess, forming an insulating layer on the metal layer, forming a semiconductor layer on the insulating layer, the semiconductor layer having an aperture, and forming a reflective layer on the semiconductor layer, wherein, on a surface of the reflective layer in the reflection region, a first recess and a second recess are formed, the second recess being formed inside the first recess; and one of the first recess and the second recess is formed according to by the aperture or recess of the metal layer, and the other of the first recess and the second recess is formed according to the aperture of the semiconductor layer.

In one embodiment, the step of forming the metal layer comprises a step of forming a gate layer of the semiconductor device; and a tilting angle of a side face of the gate layer with respect to the display surface is made larger than a tilting angle of a side face of the aperture or recess of the metal layer with respect to the display surface.

In one embodiment, on the surface of the reflective layer inside the first recess but outside the second recess, a flat surface which is generally parallel to the display surface is formed.

In one embodiment, a side face of the aperture or recess of the metal layer includes a face whose tilting angle with respect to the display surface is 20 degrees or less.

In one embodiment, an average tilting angle of a side face of the aperture or recess of the metal layer with respect to the display surface is 20 degrees or less.

In one embodiment, a depth of the aperture of the metal layer is no less than 50 nm and no more than 1000 nm, and a width of the side face of the aperture of the metal layer as seen from a perpendicular direction with respect to the display surface is no less than 100 nm and no more than 4000 nm.

In one embodiment, a depth of the recess of the metal layer is no less than 20 nm and no more than 1000 nm, and a width of the side face of the recess of the metal layer as seen from a perpendicular direction with respect to the display surface is no less than 100 nm and no more than 4000 nm.

In one embodiment, the step of forming the metal layer comprises a step of forming a first layer, a step of stacking a second layer on the first layer, and a step of forming an aperture in the second layer.

In one embodiment, the first layer is made of aluminum, and the second layer is made of titanium or titanium nitride.

In one embodiment, the metal layer is formed by a photolithography and etching using halftone exposure, and the gate layer is formed by a photolithography and etching not using halftone exposure.

In one embodiment, a third recess which is located inside the first recess is formed on the surface of the reflective layer.

In one embodiment, the third recess is formed according to an opening or recess which is formed inside the recess of the metal layer.

In one embodiment, a plurality of apertures or recesses are formed in the metal layer.

One embodiment comprises a step of forming an interlayer insulating layer on the reflective layer and a step of forming a pixel electrode on the interlayer insulating layer, wherein, a face of the pixel electrode is formed flat without conforming to shapes of the first recess and the second recess of the reflective layer.

In one embodiment, the step of forming the metal layer comprises a step of forming a first metal layer and a step of forming on the first metal layer a second metal layer from a material which is different from that of the first metal layer; an aperture is formed in each of the first metal layer and the second metal layer; and the aperture of the first metal layer is formed inside the aperture of the second metal layer.

In one embodiment, the first metal layer is made of aluminum, and the second metal layer is made of molybdenum.

In one embodiment, the step of forming the metal layer comprises a step of forming on the second metal layer a third metal layer from a material which is different from those of the first metal layer and the second metal layer; and an aperture is formed in the third metal layer, the aperture of the second metal layer being located inside the aperture of the third metal layer.

In one embodiment, the first metal layer is made of aluminum; the second metal layer is made of molybdenum nitride; and the third metal layer is made of molybdenum.

In one embodiment, in the step of forming the metal layer, the composition of the metal layer varies along a thickness direction of the metal layer.

In one embodiment, the metal layer is made of molybdenum nitride; and in the step of forming the metal layer, a nitrogen content in the molybdenum nitride of the metal layer decreases over time.

EFFECTS OF THE INVENTION

According to the present invention, low-cost transflective-type and reflection-type liquid crystal display devices having a high image quality are provided.

BRIEF DESCRIPTION OF DRAWINGS

FIG. 2 A diagram showing the construction of pixel regions and a reflection section of Embodiment 1, (a) being a plan view of pixel regions, and (b) being a plan view of a reflection section, both as seen from above the display surface.

FIG. 3 A cross-sectional view showing the construction of a reflection section and a TFT section of Embodiment 1, where (a) shows the construction of a reflection section, and (b) shows the construction of a TFT section.

FIG. 4 A schematic diagram for comparison of a reflection section of Embodiment 1 and a reflection section of a conventional liquid crystal display device, where: (a) is a diagram showing a cross section of a reflection section of Embodiment 1; (b) is a diagram showing a cross section of a reflection section of a conventional liquid crystal display device; and (c) is a diagram for describing surface angles at a corner portion of the reflection section.

FIG. 6 Cross-sectional views showing a production method for a TFT section of Embodiment 1.

FIG. 8 Cross-sectional views showing a production method for a reflection section of Embodiment 1.

FIG. 10 A cross-sectional view showing a variant of the reflection section of Embodiment 1.

FIG. 11 A cross-sectional view showing the construction of a reflection section and a TFT section of Embodiment 2, where (a) shows the construction of a reflection section, and (b) shows the construction of a TFT section.

FIG. 16 Cross-sectional views showing a production method for a Cs metal layer of Embodiment 4.

FIG. 18 Cross-sectional views showing a production method for a Cs metal layer of Embodiment 5.

FIG. 20 Cross-sectional views showing a production method for a Cs metal layer of Embodiment 6.

FIG. 24 A diagram showing a relationship between a tilt of a reflection surface and reflected light in a liquid crystal display device, where (a) shows a relationship between an incident angle α and an outgoing angle β when light enters a medium b having a refractive index Nb from a medium a having a refractive index Na, and (b) is a diagram showing a relationship between incident light and reflected light as well as the angle of the display surface of the liquid crystal display device.

DESCRIPTION OF REFERENCE NUMERALS

Figure 1:
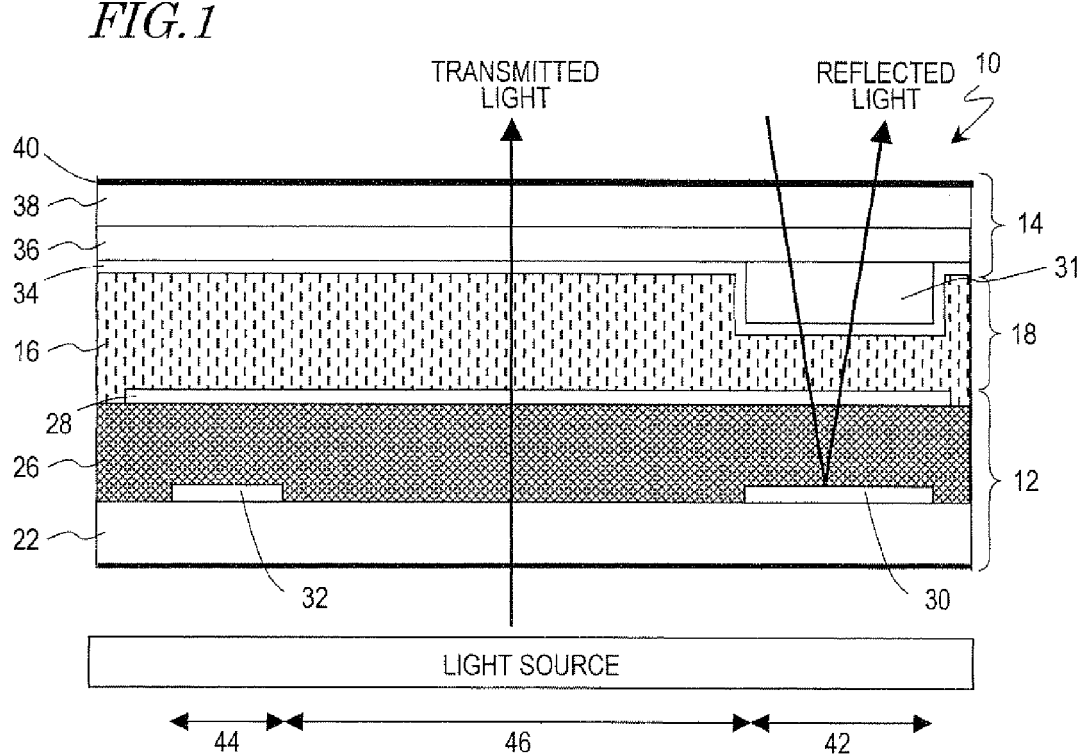
FIG. 1 A diagram schematically showing a cross-sectional shape of a liquid crystal display device according to Embodiment 1 of the present invention.

| | |
|---|---|
| 10 | liquid crystal display device |
| 12 | TFT substrate |

-continued

DESCRIPTION OF REFERENCE NUMERALS

| | |
|---|---|
| 14 | counter substrate |
| 16 | liquid crystal |
| 18 | liquid crystal layer |
| 22 | transparent substrate |
| 26 | interlayer insulating layer |
| 28 | pixel electrode |
| 30, 30' | reflection section |
| 31 | layer of transparent resin or the like |
| 32 | TFT section |
| 34 | counter electrode |
| 36 | CF layer |
| 38 | transparent substrate |
| 40 | display surface |
| 42 | reflection region |
| 44 | TFT region |
| 46 | transmission region |
| 48 | recess |
| 50 | pixel |
| 52 | source line |
| 54 | gate line (gate metal layer) |
| 56, 56' | Cs line (Cs metal layer) |
| 57 | first metal layer |
| 58 | contact hole |
| 59, 59' | second metal layer |
| 60 | third metal layer |
| 61 | gate insulating layer |
| 62 | semiconductor layer |
| 63 | reflective layer |
| 64, 65, 65', 65'', 67, 67', 69, 69', 95, 97 | aperture |
| 66, 66', 68, 73, 73'74, 74', 76, 96 | side face |
| 70, 70'71, 71', 77, 78, 79, 90, 98 | recess |
| 72, 72' | flat surface |
| 75, 75' | bottom face |
| 80, 81, 85 | resist |
| 91 | lower layer |
| 92 | intermediate layer |
| 93 | upper layer |
| 100 | active matrix substrate |
| 101 | insulative substrate |
| 102 | gate layer |
| 104 | gate insulating layer |
| 106 | semiconductor layer |
| 108 | metal layer |
| 110 | reflective layer |
| 112 | reflection surface |
| 203 | switching element |
| 204 | interlayer insulating film |
| 205 | galvanic corrosion preventing film |
| 206 | reflection electrode film |
| 211 | liquid crystal layer |
| 218 | amorphous transparent electrode film |
| 222 | drain electrode |

BEST MODE FOR CARRYING OUT THE INVENTION

Embodiment 1

Hereinafter, with reference to the drawings, a first embodiment of the liquid crystal display device according to the present invention will be described.

FIG. 1 schematically shows a cross-sectional structure of a liquid crystal display device 10 of the present embodiment. The liquid crystal display device 10 is a transflective-type liquid crystal display device by an active matrix method. As shown in FIG. 1, the liquid crystal display device 10 includes a TFT (Thin Film Transistor) substrate 12, a counter substrate 14, and a liquid crystal layer 18 containing liquid crystal 16 which is sealed between the TFT substrate 12 and the counter substrate 14.

The TFT substrate 12 comprises a transparent substrate 22, an interlayer insulating layer 26, and a pixel electrode 28, and includes reflection sections 30 and TFT sections 32. Gate lines (scanning lines), source lines (signal lines), Cs lines (storage capacitor electrode lines), and the like are formed on the TFT substrate 12, which will be described later.

The counter substrate 14 is a color filter substrate (CF substrate), which includes a counter electrode 34, a color filter layer (CF layer) 36, and a transparent substrate 38. The upper face of the transparent substrate 38 serves as a display surface 40 of the liquid crystal display device. Note that although the TFT substrate 12 and the counter substrate 14 each have an alignment film and a polarizer in actuality, they are omitted from the figure.

In the liquid crystal display device 10, a region where a reflection section 30 is formed is referred to as a reflection region 42, whereas a region where a TFT section 32 is formed is referred to as a TFT region 44. In the reflection region 42, light entering from the display surface 40 is reflected by the reflection section 30, and travels through the liquid crystal layer 18 and the counter substrate 14 so as to go out from the display surface 40. The liquid crystal display device 10 further has transmission regions 46 which are formed in regions other than the reflection regions 42 and the TFT regions 44. In the transmission regions 46, light which is emitted from a light source in the display device 10 travels through the TFT substrate 12, the liquid crystal layer 18, and the counter substrate 14 so as to go out from the display surface 40.

Note that, by providing a layer 31 of transmissive resin or the like on the counter substrate 14 above each reflection section 30 as shown in FIG. 1, it is possible to reduce the thickness of the liquid crystal layer 18 in the reflection region 42 to a half of the thickness of the liquid crystal layer 18 in the transmission region 46. As a result, the optical path length (the distance traveled by light in the liquid crystal layer 18) can be made equal between the reflection region 42 and the transmission region 46. Although FIG. 1 illustrates the layer 31 as being disposed between the counter electrode 34 and the CF layer 36, the layer 31 may be formed on the face of the counter electrode 34 facing the liquid crystal layer 18.

FIG. 2 is plan views showing the constructions of pixel regions and a reflection section 30 of the liquid crystal display device 10 more specifically.

FIG. 2(a) is a diagram of some of the pixel regions of the liquid crystal display device 10, as seen from above the display surface 40. As shown in this figure, a plurality of pixels 50 (portions indicated by thick lines in rectangular shape) are disposed in a matrix shape in the liquid crystal display device 10. The aforementioned reflection section 30 and TFT section 32 are formed in each pixel 50, with a TFT being formed in the respective TFT section 32.

In the border of the pixel 50, source lines 52 extend along the column direction (up-down direction in the figure), and gate lines (gate metal layers) 54 extend along the row direction (right-left direction in the figure). In the central portion of the pixel 50, a Cs line (Cs metal layer) 56 extends along the row direction. In the interlayer insulating layer 26 of the reflection region 30, a contact hole 58 for connecting the pixel electrode 28 and the drain electrode of the TFT is formed.

FIG. 2(b) is a plan view schematically showing the construction of the reflection section 30 above the Cs line 56. The contact hole 58 illustrated in FIG. 2(a) is omitted from this figure. As shown in the figure, a plurality of circular recesses (tapered portions) 48 having level differences are formed in the reflection section 30. Note that, although eight recesses 48 are illustrated in the figure in order to clearly show the construction, the number of recesses 48 is not limited to eight, but more recesses 48 may be formed. Moreover, as will be described later, a reflective layer 63 is formed in an upper portion of the reflection section 30, such that a face of the reflective layer 63 forms the surface of the recess 48. The reflective layer 63 is connected to the drain electrode of the TFT in the TFT section 32.

Next, with reference to FIG. 3, the construction of the reflection section 30 and the TFT section 32 will be described more specifically.

FIG. 3(a) shows a cross section of a recess 48 in the reflection section 30 (a cross section of a portion shown by arrow B in FIG. 2(b)). As shown in the figure, in the reflection section 30, the Cs metal layer (metal layer) 56, the gate insulating layer (insulating layer) 61, the semiconductor layer 62, and the reflective layer 63 are stacked on the transparent substrate 22. The semiconductor layer 62 is composed of an intrinsic amorphous silicon layer (Si(i)layer) and an $n^+$ amorphous silicon layer (Si($n^+$)layer) which is doped with phosphorus.

As shown in the figure, an aperture 65 is formed in the Cs metal layer 56, and a side face 66 of the Cs metal layer 56 that surrounds the aperture 65 has a tilting angle of 20 degrees or less with respect to the plane of the transparent substrate 22 (or the display surface 40 of the liquid crystal display device 10). The thickness of the Cs metal layer 56 (depth of the aperture 65) is 50 to 1000 nm, and the width of the side face 66 as seen perpendicularly with respect to the transparent substrate 22 is 100 to 4000 nm.

On the surface of the reflective layer 63, a recess (first recess) 70 and a recess (second recess) 71 are formed. The recess 70 is a dent which is formed in accordance with the aperture 65 and the side face 66 of the Cs metal layer 56, whereas the recess 71 is a dent which is formed in accordance with an aperture 67 and a side face 68 of the semiconductor layer 62. The recess 71 is formed inside the recess 70. Furthermore, a recess 79 is formed on the surface of reflective layer 63 in a portion between adjoining semiconductor layers 62. Note that, instead of the aperture 67, a recess may be formed in the semiconductor layer 62. In that case, the recess 71 is to be formed in accordance with the recess (as well as the side face) of the semiconductor layer 62.

On the surface of the reflective layer 63 inside the recess 70 but outside the recess 71, a flat surface 72 which is generally parallel to the plane of the transparent substrate 22 (or the display surface 40 of the liquid crystal display device 10) is formed. A side face 73 of the recess 70 is formed correspondingly to the side face 66 of the Cs metal layer 56, whereas a side face 74 of the recess 71 is formed correspondingly to the side face 68 of the semiconductor layer 62. Inside the side face 74, a bottom face 75 of the recess 71 is formed generally parallel to the plane of the transparent substrate 22.

When seen perpendicularly with respect to the plane of the transparent substrate 22 (or the display surface 40), the recess 70 and the recess 71 are in the shapes of concentric circles. Note that the shapes of the recess 70 and recess 71 are not limited to concentric circles, but they may be formed in various shapes, as will be described later.

FIG. 3(b) illustrates a cross section showing the construction of the gate metal layer (metal layer) 54, the gate insulating layer 61, the semiconductor layer 62, and the reflective layer 63 in the TFT section 32 (cross section of a portion shown by arrow A in FIG. 2(a)). The gate metal layer 54 composes a gate layer of the TFT in the TFT section 32. The gate metal layer 54 is formed concurrently with and from the same member as the Cs metal layer 56 of the reflection section 30. Similarly, the gate insulating layer 61, the semiconductor layer 62, and the reflective layer 63 of the TFT section 32 are formed concurrently with and from the same members as the gate insulating layer 61, the semiconductor layer 62, and the reflective layer 63 of the reflection section 30, respectively.

Note that, as will be specifically described later, the side face 66 of the Cs metal layer 56 in the reflection section 30 is formed through a patterning using halftone exposure, whereas the side face 76 of the gate metal layer 54 in the TFT section 32 is formed without using halftone exposure. As a result, the side face 66 of the Cs metal layer 56 is formed with a smaller tilting angle than that of the side face 76 of the gate metal layer 54.

Figure 22:
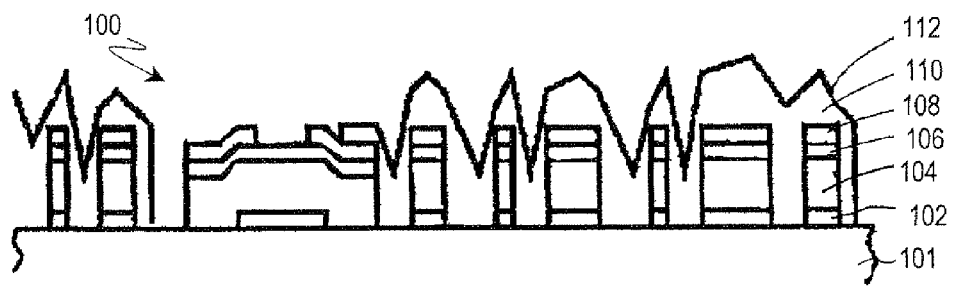
FIG. 22 A cross-sectional view showing an active matrix substrate of a conventional reflection-type liquid crystal display device.

FIG. 4 is a diagram for comparison in structure between the reflection section 30 of the present embodiment and the reflection section of the conventional liquid crystal display device shown in FIG. 22. FIG. 4(a) schematically shows a cross-sectional structure of the reflection section 30 of the present embodiment, whereas FIG. 4(b) schematically shows a cross-sectional structure of the reflection section of the conventional liquid crystal display device. As shown in these figures, on the surface of the reflective layer 63 in the present embodiment, eight corner portions (portions shown by dotted line in the figure) are formed in the recess 70 and the recess 71 when seen in their cross-sectional shapes. On the other hand, in the conventional liquid crystal display device, only four corner portions are formed in one recess.

As shown in FIG. 4(c), in a corner portion of the reflective layer, a face having a tilting angle of the side face of the recess (exemplified as 30 degrees in this figure) from a plane which is parallel to the substrate is continuously formed. Therefore, by forming more recesses in the reflection section, even if the tilting angle of the side face of the recess is greater than 20 degrees, it becomes possible to form more effective reflection surfaces (faces having an angle of 20 degrees with respect to the substrate). Moreover, since the effective reflection surfaces that are formed in a corner portion have various tilting angles which are different from one another, the reflected light will not travel in one fixed direction. Therefore, by forming more recesses, it becomes possible to obtain more reflected light which spans a broad range. Moreover, by increasing the number of recesses and ensuring that the tilting angle of the side face of any recess is 20 degrees or less, more reflected light which spans an even broader range can be obtained.

As shown in FIGS. 4(a) and (b) in comparison, double recesses with level differences are formed in the reflection section 30 of the present embodiment, so that more corner portions are formed than in the conventional reflection section. Moreover, the side face 73 of the reflective layer 63 has a tilting angle which is smaller than 20 degrees, in accordance with the side face 66 of the Cs metal layer 56. Therefore, the surface of the reflective layer 63 has more effective reflection surfaces, whereby more light can be reflected toward the display surface across a broad range. Moreover, the recess 70 and the recess 71 are formed in accordance with the shapes to which the Cs metal layer 56 and the semiconductor layer 62 are shaped. Therefore, the shapes, depths, and slope tilting angles of these recesses can be easily adjusted during the shaping of the Cs metal layer 56 and the semiconductor layer 62.

Not only the side face 66 of the Cs metal layer 56, but also the side face 74 of the semiconductor layer 62 may be formed with a tilting angle of 20 degrees or less. In that case, the tilting angle of the side face 74 of the recess 71 can also be made 20 degrees or less, whereby the area of the effective reflection surfaces can be further increased.

In the conventional liquid crystal display device, a recess is formed by removing the gate layer 102, the gate insulating layer 104, and the semiconductor layer 106. As a result, none of the gate layer 102, the gate insulating layer 104, or the semiconductor layer 106 is present under the bottom Lace of the recess, so that the bottom face of the recess is formed at a deep position. Therefore, in the conventional liquid crystal display device, the side face of a recess has a large tilting angle, which makes it difficult to form within the recess a large number of effective reflection surfaces having a tilt of 20 degrees or less. Moreover, this recess is formed by once stacking the gate layer 102, the gate insulating layer 104, and the semiconductor layer 106, and thereafter altogether removing these layers. Therefore, it is impossible to control the shape of the inner surface of the recess and the tilting angle of the slope, thus making it difficult to increase the effective reflection surfaces.

In the present embodiment, at least the gate insulating layer 61 and the semiconductor layer 62 are present under the recess 70, and at least the gate insulating layer 61 is present under the recess 71. Therefore, the inner surfaces of the recess 70 and the recess 71 are formed at positions shallower than the bottom face of a recess of the conventional liquid crystal display device. As a result, the side face 73 of the recess 70 and the side face 74 of the recess 71 can be formed with a gentler tilt than that of the side face of a recess of the conventional liquid crystal display device, thus making it possible to form more effective reflection surfaces within the recess.

Moreover, in the liquid crystal display device of the present embodiment, double recesses are formed on the surface of the reflective layer 63 in accordance with the shapes of the Cs metal layer 56 and the semiconductor layer 62. Therefore, when stacking the Cs metal layer 56 and the semiconductor layer 62, their shapes (the shapes and angles of their slopes, the shapes, sizes, positions of their apertures, and so on) can be adjusted. As a result, the tilt of the surface of the reflective layer 63 can be controlled, whereby a larger number of effective reflection surfaces can be easily formed.

Figure 23:
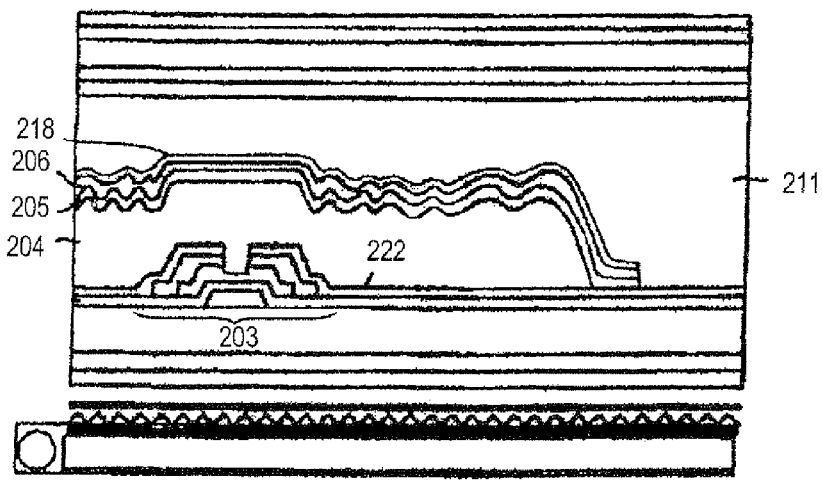
FIG. 23 A cross-sectional view of a conventional transflective-type liquid crystal display device.

Furthermore, in the liquid crystal display device of the present embodiment, similarly to the face of the counter electrode 34 that is on the liquid crystal layer 18 side, the faces of the interlayer insulating layer 26 and the pixel electrode 28 that are on the liquid crystal layer 18 side are formed flat without conforming to the shapes of the recesses 70 and 71 of the reflective layer 63. Therefore, as compared to the conventional transflective-type liquid crystal display device shown in FIG. 23, the cell gap of the liquid crystal layer 18 and the electric field to be applied across the liquid crystal layer 18 are uniform, thus making it possible to uniformly control the orientation of the liquid crystal of the reflection region 42 in a desired direction. Moreover, since no level differences are formed in the pixel electrode 28 near the ends of the reflection section 30, the liquid crystal orientation is not disturbed. As a result, according to the present embodiment, a liquid crystal display device can be provided which has a high transmittance and excellent viewing angle characteristics, with little display unevenness.

Next, a production method for the TFT substrate 12 according to the present embodiment will be described.

Figure 5:
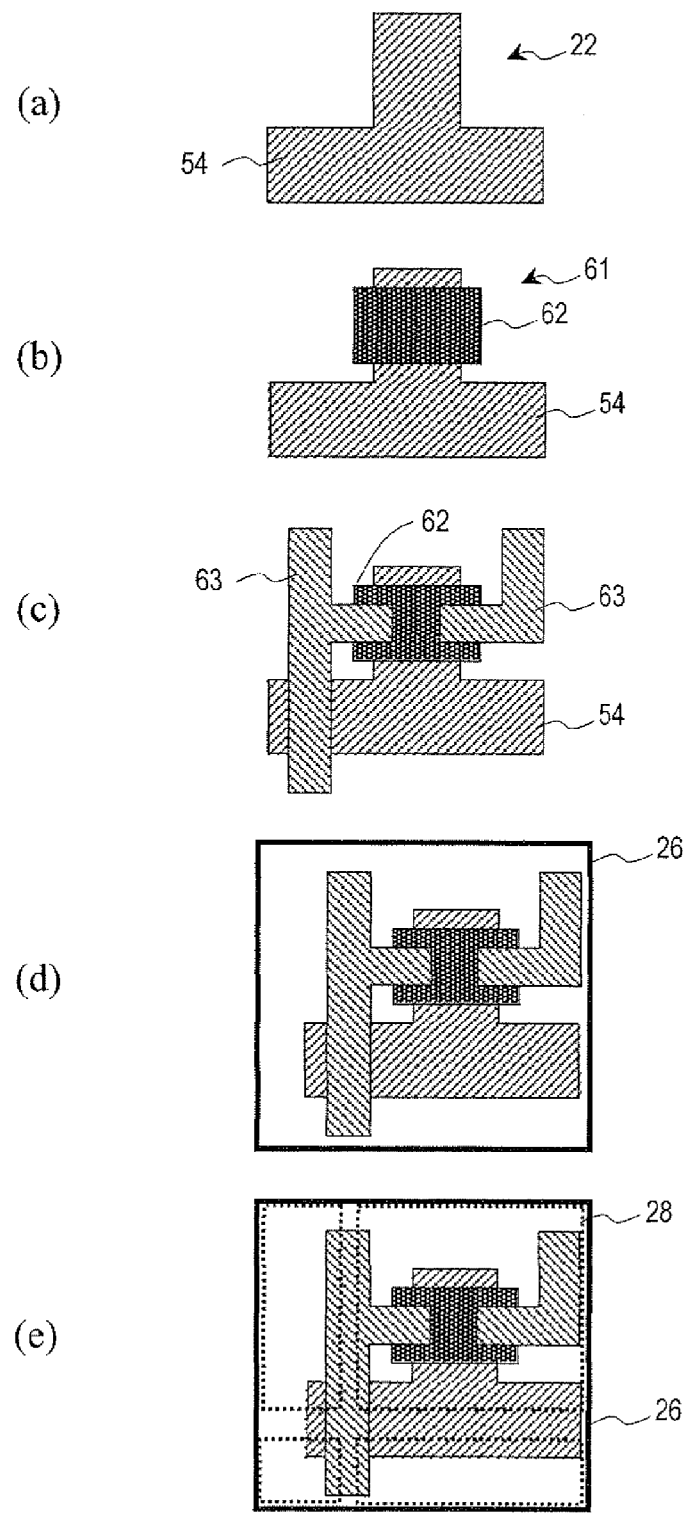
FIG. 5 Plan views showing a production method for a TFT section of Embodiment 1.

FIG. 5 is plan views showing a production method for the TFT substrate 12 in the TFT section 32. FIG. 6 is cross-sectional views showing a production method for the TFT substrate 12 in the TFT section 32, showing cross sections of a portion indicated by arrow A in FIG. 2(a).

As shown in FIG. 5(a) and FIG. 6(a), first, by a method such as sputtering, a thin metal film of Ta (tantalum) is formed on the transparent substrate 22 having been cleaned. Note that, other than Ta, this thin metal film may be formed by using Al (aluminum), Ti (titanium), Cr (chromium), Mo (molybdenum), Ta (tantalum), W (tungsten), or an alloy thereof, etc., or formed from a multilayer body of a layer of such materials and a nitride film.

Thereafter, a resist film is formed on the thin metal film, and after forming a resist pattern through an exposure and development step, a dry etching is performed to form the gate metal layer (metal layer) 54. The gate metal layer 54 has a thickness of 50 to 1000 nm, for example. Note that wet etching may be employed as the etching.

Thus, the gate metal layer 54 which is formed by photolithography technique serves as a gate electrode of the TFT. Note that, in this step, the gate line (gate metal layer) 54 shown in FIG. 2(a) and the Cs metal layer 56 of the reflection section 30 shown in FIG. 3(a) are also formed from the same metal. The steps of forming the gate metal layer 54 and the Cs metal layer 56 will be specifically described later.

Next, as shown in FIG. 5(b) and FIG. 6(b), by using P-CVD technique and a gaseous mixture of $SiH_4$, $NH_3$, and $N_2$, the gate insulating layer 61 composed of SiN (silicon nitride) is formed across the entire substrate surface. The gate insulating layer 61 may also be composed of $SiO_2$ (silicon oxide), $Ta_2O_5$ (tantalum oxide), $Al_2O_3$ (aluminum oxide), or the like. The thickness of the gate insulating layer 61 is 100 to 600 nm, for example. In this step, the gate insulating layer 61 of the reflection section 30 shown in FIG. 3(a) is also formed concurrently.

Next, on the gate insulating layer 61, an intrinsic amorphous silicon (a-Si) film (Si(i) film) and an $n^+$a-St film ($Si(n^+)$ film) obtained by doping amorphous silicon with phosphorus (P) are formed. The thickness of the a-Si film is 20 to 300 nm, for example, and the thickness of the $n^+$a-Si film is 20 to 100 nm, for example. Thereafter, these films are shaped by photolithography technique, whereby the semiconductor layer 62 is formed. In this step, the semiconductor layer 62 of the reflection section 30 shown in FIG. 3(a) is also formed concurrently.

Next, as shown in FIG. 5(c) and FIG. 6(c), a thin metal film of Al or the like is formed across the entire substrate surface by sputtering technique or the like, and a photolithography technique is performed to form the reflective layer 63. For the thin metal film, the materials which are mentioned above as materials for the gate metal layer 54 may be used. The thickness of the reflective layer 63 is 30 to 1000 nm, for example.

In the TFT section 32, the reflective layer 63 forms a source electrode and a drain electrode of the TFT. At this time, the source line 52 in FIG. 2(a) is also formed as a portion of the reflective layer 63, and the reflective layer 63 of the reflection section 30 shown in FIG. 3(a) is also formed concurrently.

Next, as shown in FIG. 5(d) and FIG. 6(d), a photosensitive acrylic resin is applied by spin-coating, whereby the interlayer insulating layer (interlayer resin layer) 26 is formed. The thickness of the interlayer insulating layer 26 is 0.3 to 5 μm, for example. Although a thin film such as $SiN_x$ or $SiO_2$ may be formed by P-CVD technique as a protection film between the reflective layer 63 and the interlayer insulating layer 26, such is omitted from the figure. The thickness of the protection film is 50 to 1000 nm, for example. The interlayer insulating layer 26 and the protection film are formed not only on the TFT section 32, but also on the entire upper surface of the transparent substrate 22 including the reflection section 30.

Next, as shown in FIG. 5(e) and FIG. 6(e), on the interlayer insulating layer 26, a transparent electrode film such as ITO or IZO is formed by sputtering technique or the like. This transparent electrode film is pattern shaped by photolithography technique, whereby the pixel electrode 28 is formed. The pixel electrode 28 is formed not only on the TFT section 32 but also on the entire upper surface of the pixel including the reflection section 30.

Next, by using FIG. 7 and FIG. 8, a production method for the TFT substrate 12 in the reflection section 30 will be described.

Figure 7:
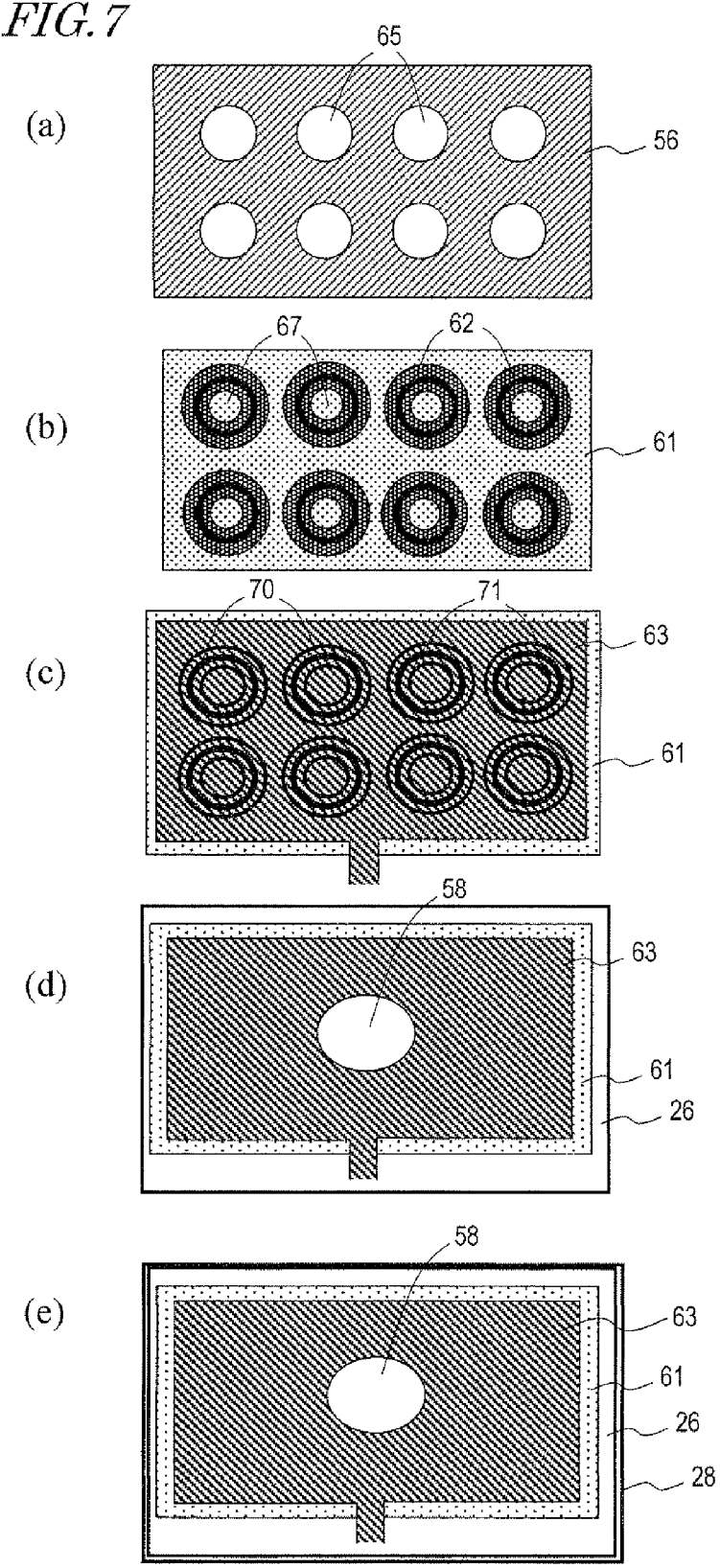
FIG. 7 Plan views showing a production method for a reflection section of Embodiment 1.

FIG. 7 is plan views showing a production method for the TFT substrate 12 in the reflection section 30. FIG. 8 is cross-sectional views showing a production method for the TFT substrate 12 in the reflection section 30, showing cross sections of a portion indicated by arrow B in FIG. 2(b). The steps of (a) to (e) in FIG. 7 and FIG. 8 respectively correspond to the steps of (a) to (e) in FIG. 5 and FIG. 6.

As shown in FIG. 7(a) and FIG. 8(a), the Cs metal layer 56 in the reflection section 30 is formed on the transparent substrate 22 from the same metal as the gate metal layer 54 of the TFT section 32. A plurality of apertures 65 are formed in the Cs metal layer 56. The step of forming the Cs metal layer 56 will be specifically described later, together with the step of forming the gate metal layer 54.

Next, as shown in FIG. 7(b) and FIG. 8(b), by a method similar to that for the TFT section 32, the gate insulating layer 61 is formed on the Cs metal layer 56, and thereafter the semiconductor layer 62 is formed. The thickness of the semiconductor layer 62 is 40 to 400 nm, for example. As shown in FIG. 7(b), the semiconductor layer 62 is formed as a plurality of circular portions, with an aperture 67 being formed in the central portion of each circular portion. Note that, instead of the apertures 67, recesses may be formed in the semiconductor layer 62.

Next, as shown in FIG. 7(c) and FIG. 8(c), the reflective layer 63 is formed over the gate insulating layer 61 and the semiconductor layer 62 by a method similar to that for the TFT section 32. At this time, in the apertures 67 of the semiconductor layer 62, the reflective layer 63 is formed so as to be in contact with the gate insulating layer 61. In accordance with the shapes of the Cs metal layer 56 and the semiconductor layer 62, recesses 70 and recesses 71 are formed on the surface of the reflective layer 63. Note that, in the case where the semiconductor layer 62 includes recesses instead of apertures 67, the reflective layer 63 is formed so as to cover the recesses.

Next, as shown in FIG. 7(d) and FIG. 8(d), the interlayer insulating layer 26 is formed from photosensitive acrylic resin. Thereafter, through a development process using an exposure apparatus, a contact hole 58 is formed near the center of the reflection section 30.

Next, as shown in FIG. 7(e) and FIG. 8(e), the pixel electrode 28 is formed. In the reflection section 30, the pixel electrode 28 is formed above the interlayer insulating layer 26 and the contact hole 58, such that the metal member of the pixel electrode 28 is in contact with the reflective layer 63 via the contact hole 58. As a result, the drain electrode of the TFT in the TFT section 32 is electrically connected with the pixel electrode 28 via the contact hole 58.

Preferably, as many recesses 70 and recesses 71 as possible are formed in the reflection section 30. Therefore, it is preferable that as many apertures 65 in the Cs metal layer 56 and as many apertures 67 in the semiconductor layer 62 as possible are formed on the reflection surface, within the technological limits of the masks, photoexposure, etching, and the like in the production steps. The preferable size of the apertures 65 in the Cs metal layer 56 is 1.5 to 8.0 μm in diameter, whereas the preferable size of the apertures 67 in the semiconductor layer 62 is 1.0 to 7.0 μm in diameter. Moreover, the preferable sizes of the outer peripheries of the recesses 70 and the recesses 71 are to 12.0 μm and 1.0 to 11.0 μm in diameter, respectively.

Next, the methods for forming the gate metal layer 54 and the Cs metal layer 56 described above will be described more specifically.

Figure 9:
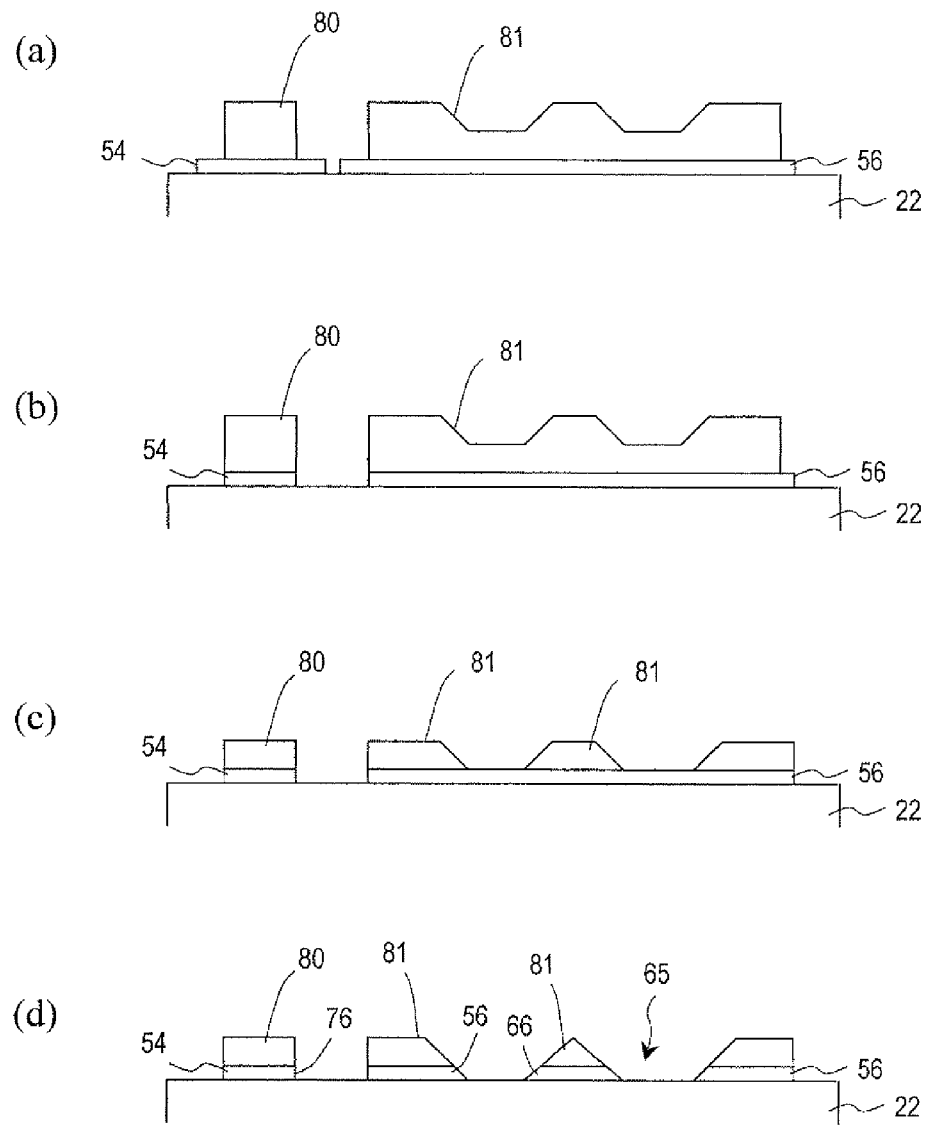
FIG. 9 Cross-sectional views showing a production method for a Cs metal layer of Embodiment 1.

FIG. 9 is cross-sectional views for describing the methods for methods for forming the gate metal layer 54 and the Cs metal layer 56. In this figure, for facility of description, the gate metal layer 54 and the Cs metal layer 56 are illustrated as being closer than they actually are. Moreover, only two apertures 65 of the Cs metal layer 56 are illustrated.

First, as shown in FIG. 9(*a*), on the unpatterned gate metal layer 54 and Cs metal layer 56 formed on the transparent substrate 22, resist 80 and 81 of e.g. a positive type is applied to a thickness of 1200 to 2800 nm, for example. Thereafter, a mask pattern (reticle pattern) is transferred to the resist 80 and 81 via exposure, and the resist 80 and 81 are patterned.

At exposure, a mask pattern which is drawn in two kinds of portions having different transmittances (i.e., transmitting portions and light shielding portions) is used for the resist 80 on the gate metal layer 54. This exposure method will be referred to as a "usual exposure" in the present specification.

On the other hand, a "halftone exposure" is used for the resist 81 on the Cs metal layer 56. For a "halftone exposure", a mask with a pattern which is drawn by using transmitting portions, light shielding portions, and transflective portions is used. The transflective portions are formed from a translucent film such as chromium (Cr), magnesium oxide (MgO), molybdenum silicide (MoSi), amorphous silicon (a-Si), or the like. Note that the transflective portions may be formed so as to have a uniform transmittance by using one of translucent films composed of the aforementioned materials, or formed so as to have a stepwise- or gradually-changing transmittance by using a plurality of kinds of translucent films. Moreover, the thickness of the translucent film may be varied so as to result in a varying transmittance.

Moreover, a pattern may be drawn with a plurality of slits in the mask that is used for "halftone exposure". In this case, transflective portions having a stepwise or gradually-changing transmittance can be formed by varying the line width of the slits, varying the interval between adjoining slits, and so on.

After transferring the mask pattern by using "usual exposure" and "halftone exposure", removal of the resist and cleaning are performed, whereby the resist 80 and 81 as shown in FIG. 9(*a*) is formed on the gate metal layer 54 and the Cs metal layer 56. A recess for forming the aperture 65 in the Cs metal layer is formed in the resist 81.

Next, a dry etching process (hereinafter referred to as a first etching process) is performed, whereby the portions of the gate metal layer 54 and the Cs metal layer 56 that are not covered by the resist 80 and 81 are removed, as shown in FIG. 9(*b*). As an etching gas, a gaseous mixture of $CF_4$ and $O_2$ is used, for example.

Next, an ashing treatment using oxygen ($O_2$) gas is performed, for example. Thus, upper portions of the resist 80 and 81 are removed, whereby resist in shapes as shown in FIG. 9(*c*) is left. The remaining resist 80 has a uniform thickness upon the gate metal layer 54. The remaining resist 81 has a tapered cross section as shown in the figure, such that the Cs metal layer 56 is exposed within the aperture formed in the resist 81.

Thereafter, a dry etching process is again performed (hereinafter referred to as a second etching process), whereby the gate metal layer 54 and the Cs metal layer 56 in shapes as shown in FIG. 9(*d*) are formed. Since the gate metal layer 54 was covered with the resist 80 having a uniform thickness before being etched, the side face 76 thereof is formed with a taper angle which is nearly perpendicular to the substrate plane. As the etching gas, a gaseous mixture of $CF_4$ and $O_2$ is used, for example.

On the other hand, since the resist 81 having a tapered cross section was formed on the Cs metal layer 56, the thin portions of the resist 81 are also removed through the etching. The Cs metal layer 56 under the eliminated resist 81 is removed, down to a depth which is substantially in inverse proportion to the thickness of the resist 81 formed thereon. As a result, the side face 66 of the Cs metal layer 56 is formed so as to have a taper angle which is smaller than that of the side face 76 of the gate metal layer 54. $CF_4$ increases the etching rate of Ta, whereas $O_2$ increases the etching rate of the resist. Thus, by adjusting the mixing ratio between $CF_4$ and $O_2$ in the etching gas, it is possible to arbitrarily adjust the taper angle of the side face 66 of the Cs metal layer 56 to be formed. As a result, the side face 66 having a tilt of 20 degrees or less with respect to the substrate plane can be easily formed.

The remaining resist 80 and 81 is removed after the etching process is finished, whereby the Cs metal layer 56 having the aperture 65 as shown in FIG. 3(*a*) and the gate metal layer 54 as shown in FIG. 3(*b*) are formed. Although FIGS. 9(*a*) to (*d*) illustrate the side face 76 of the gate metal layer 54 as a face which is perpendicular to the substrate plane, in actuality, the side face 76 is formed as a face which is not completely perpendicular but is slightly tilted. However, since the gate metal layer 54 and the Cs metal layer 56 are formed as described above, the tilting angle of the side face 76 of the gate metal layer 54 is larger than the tilting angle of the side face 66 of the Cs metal layer 56.

Although the aforementioned method illustrates that the "usual exposure" is applied to the gate metal layer 54 in the TFT section 32, the "usual exposure" is also applicable to the entire gate line (gate metal layer) 54 shown in FIG. 2(*a*). The line width of the gate line 54 needs to be controlled with a very high precision. According to the production method of the present embodiment, a "usual exposure" is applied to the gate line 54 to enable a very highly precise control of the line width thereof, and concurrently, a "halftone exposure" is applied to the Cs metal layer 56 so as to allow a slope with a small tilt to be formed. Therefore, in a liquid crystal display device, it is possible to realize a highly precise wiring structure, and easily increase the effective reflection surfaces of the reflection section 30.

Although the present embodiment illustrates that the circular apertures 65 are formed in the Cs metal layer 56, the Cs metal layer 56 may be formed as circular protrusions by employing a pattern in which the light shielding portions and the transmitting portions are inverted, for example. Hereinafter, a variant reflection section in which such a Cs metal layer 56 is used (reflection section 30') will be described, with reference to FIG. 10. Note that any constituent element that is identical to a constituent element of the reflection section 30 shown in FIG. 3 is denoted by the same reference numeral, and the description thereof is omitted.

FIG. 10 shows a cross section of a variant of a recess in the reflection section 30' (a cross section of the portion shown by arrow B in FIG. 2(*b*)). In this variant, a Cs metal layer 56' is formed in circular shape, and any region where the Cs metal layer 56' is not formed (the outside of the circular Cs metal layer 56') forms an aperture 65'. A side face 66' of the Cs metal layer 56' has a tilting angle of 20 degrees or less with respect to the plane of the transparent substrate 22 (or the display surface 40 of the liquid crystal display device 10). Note that the Cs metal layer 56' is formed by a similar method to the method shown by FIG. 9. The depth and width of the aperture 65' are the same as those in Embodiment 1 described above.

The gate insulating layer 61 is formed on the Cs metal layer 56' and over the aperture 65', and the semiconductor layer 62 in the shape shown in FIG. 7(b) is formed on the gate insulating layer 61. The Cs metal layer 56' and the semiconductor layer 62 are formed so as to be concentric circles.

On the surface of the reflective layer 63 formed on the gate insulating layer 61 and the semiconductor layer 62, a recess (first recess) 70' and a recess (second recess) 71' are formed. The recess 70' is a dent which is formed in accordance with the aperture 65' and the side face 66' of the Cs metal layer 56', whereas the recess 71' is a dent which is formed in accordance with an aperture 67' and the side face 68 of the semiconductor layer 62. The recess 71' is formed inside the recess 70'. Note that, on the surface of the reflective layer 63 above the Cs metal layer 56', a recess 90 is formed in accordance with the aperture 67 of the semiconductor layer 62. Note that, in the case where a recess is formed in the semiconductor layer 62 instead of the aperture 67, the recess 90 of the reflective layer 63 is to be formed in accordance with that recess.

On the surface of the reflective layer 63 inside the recess 70' but outside the recess 71', a flat surface 72' which is generally parallel to the plane of the transparent substrate 22 (or the display surface 40 of the liquid crystal display device 10) is formed. A side face 73' of the recess 70' is formed correspondingly to the side face 66' of the Cs metal layer 56', whereas a side face 74' of the recess 71' is formed correspondingly to the side face 68 of the semiconductor layer 62. Inside the side face 74', a bottom face 75' of the recess 71' is formed generally parallel to the plane of the transparent substrate 22.

With this variant, too, effects similar to the effects of Embodiment 1 described above can be obtained.

Embodiment 2

Next, a second embodiment of the liquid crystal display device according to the present invention will be described. The liquid crystal display device of the present embodiment differs from Embodiment 1 only with respect to the construction of the gate metal layer 54 and the Cs metal layer 56, and is identical to Embodiment 1 except for the portions described below. Any constituent element that is identical to a constituent element of Embodiment 1 is denoted by the same reference numeral, and the detailed description thereof is omitted.

FIG. 11(a) shows a cross section of a recess 48 in the reflection section 30 of Embodiment 2 (cross section of the portion indicated by arrow B in FIG. 2(b)). As shown in the figure, in the reflection section 30, the Cs metal layer 56, the gate insulating layer 61, the semiconductor layer 62, and the reflective layer 63 are stacked on the transparent substrate 22. The Cs metal layer 56 is composed of the three layers of: a lower layer 91, an intermediate layer (first layer) 92, and an upper layer (second layer) 93. The lower layer 91, the intermediate layer 92, and the upper layer 93 are made respectively of Ti (titanium), Al (aluminum), and TiN (titanium nitride), for example. The upper layer 93 may be made of Ti. Moreover, the Cs metal layer 56 may be composed of the two layers of the intermediate layer 92 and the upper layer 93, and the upper layer 93 may have a two-layer construction including a layer of Ti and a layer of TiN.

As shown in the figure, an aperture 95 is formed in the upper layer 93 of the Cs metal layer 56, and the side face 96 of the upper layer 93 surrounding the aperture 95 has a tilting angle of 20 degrees or less with respect to the plane of the transparent substrate 22 (or the display surface 40 of the liquid crystal display device 10). The thicknesses of the lower layer 91, the intermediate layer 92, and the upper layer 93 of the Cs metal layer 56 are 10 to 200 nm, 50 to 500 nm, and 10 to 300 nm, respectively, and the width of the side face 96 as seen perpendicularly with respect to the transparent substrate 22 is 100 to 4000 nm. The aperture 95 has a diameter of 1.0 to 12.0 μm.

The recess 70 and the recess 71 are formed on the surface of the reflective layer 63, similarly to Embodiment 1. The recess 70 is a dent which is formed in accordance with the aperture 95 and the side face 96 of the upper layer 93. The recess 71 is a dent which is formed in accordance with the aperture 67 and the side face 68 of the semiconductor layer 62, and is formed inside the recess 70. On the surface of the reflective layer 63 inside the recess 70 but outside the recess 71, the flat surface 72 which is generally parallel to the plane of the transparent substrate 22 is formed. The side face 73 of the recess 70 is formed correspondingly to the side face 96 of the upper layer 93, whereas the side face 74 of the recess 71 is formed correspondingly to the side face 68 of the semiconductor layer 62. Inside the side face 74, the bottom face 75 of the recess 71 is formed generally parallel to the plane of the transparent substrate 22.

FIG. 11(b) shows a cross section of the TFT section 32 (cross section of the portion indicated by arrow A in FIG. 2(a)). The TFT section 32 includes the gate metal layer 54, the gate insulating layer 61, the semiconductor layer 62, and the reflective layer 63, and the gate metal layer 54 is composed of the three layers of the lower layer 91, the intermediate layer 92, and the upper layer 93, similarly to the aforementioned Cs metal layer 56.

The gate insulating layer 61, the semiconductor layer 62, and the reflective layer 63 in the TFT section 32 are formed concurrently with and from the same members as the gate insulating layer 61, the semiconductor layer 62, and the reflective layer 63 in the reflection section 30, respectively. The lower layer 91, the intermediate layer 92, and the upper layer 93 of the gate metal layer 54 are concurrently with and from the same members as the lower layer 91, the intermediate layer 92, and the upper layer 93 of the Cs metal layer 56 in the reflection section 30, respectively.

The side face 96 of the upper layer 93 of the Cs metal Layer 56 in the reflection section 30 is formed by the aforementioned photolithography technique using "halftone exposure", whereas the side face 76 of the gate metal layer 54 in the TFT section 32 is formed by using "usual exposure". As a result, the side face 96 is formed with a smaller tilting angle than that of the side face 76.

Figure 12:
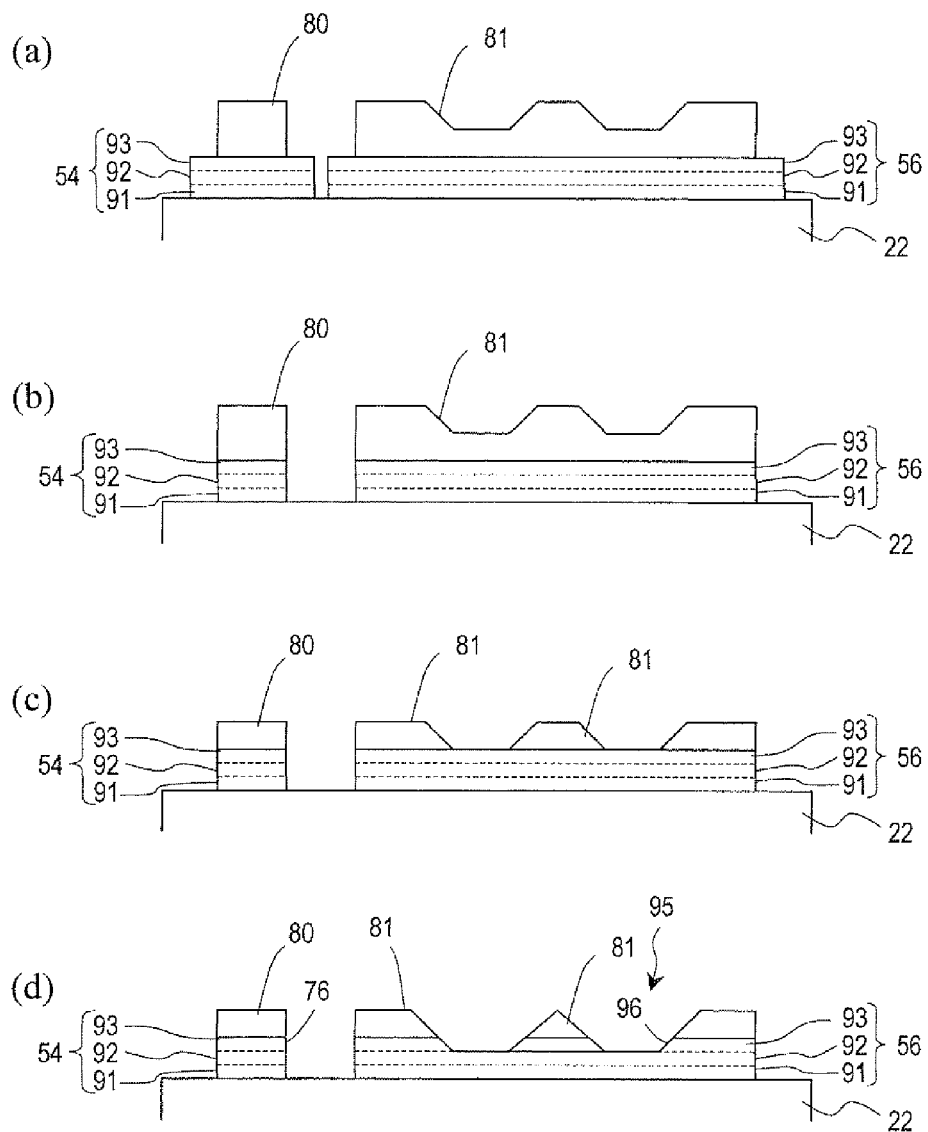
FIG. 12 Cross-sectional views showing a production method for a Cs metal layer of Embodiment 2.

FIG. 12 is a cross-sectional view showing methods for forming the gate metal layer 54 and the Cs metal layer 56 according to Embodiment 2. In this figure, for facility of description, the gate metal layer 54 and the Cs metal layer 56 are illustrated as being closer than they actually are. Moreover, only two apertures 95 of the upper layer 93 of the Cs metal layer 56 are shown.

First, as shown in FIG. 12(a), on the unpatterned gate metal layer 54 and Cs metal layer 56 formed on the transparent substrate 22, resist 80 and 81 of e.g. a positive type is applied. Thereafter, a mask pattern is transferred to the resist 80 and 81 via exposure.

A "usual exposure" is performed for the resist 80 on the gate metal layer 54, whereas a "halftone exposure" is performed for the resist 81 on the Cs metal layer 56. After transfer of the pattern via exposure, removal of the resist and cleaning are performed, whereby the resist 80 and 81 as shown in FIG. 12(a) is formed on the gate metal layer 54 and the Cs metal layer 56. A recess for forming the aperture 95 in the upper layer 93 of the Cs metal layer 56 is formed in the resist 81.

Next, a dry etching process (hereinafter referred to as a first etching process) is performed, whereby the portions of the gate metal layer 54 and the Cs metal layer 56 that are not covered by the resist 80 and 81 are removed, as shown in FIG. 12(b). As an etching gas, $Cl_2$ (chlorine) is used, for example.

Next, an ashing treatment using oxygen ($O_2$) gas or the like is performed, whereby upper portions of the resist 80 and 81 are removed. As a result, resist in shapes as shown in FIG. 12(c) is left. The remaining resist 80 has a uniform thickness upon the gate metal layer 54. The remaining resist 81 has a tapered cross section as shown in the figure. The upper layer 93 of the Cs metal layer 56 is exposed within the aperture formed in the resist 81.

Thereafter, a dry etching process is again performed (hereinafter referred to as a second etching process), whereby the gate metal layer 54 and the Cs metal layer 56 in shapes as shown in FIG. 12(d) are formed. Since the gate metal layer 54 was covered with the resist 80 having a uniform thickness before being etched, the side face 76 thereof is formed substantially perpendicularly to the substrate. On the other hand, the resist 81 having a tapered cross section, which was formed on the Cs metal layer 56, loses its thin portions through the etching, and the upper layer 93 of the Cs metal layer 56 under the eliminated resist 81 is removed, down to a depth which is substantially in inverse proportion to the thickness of the resist 81 formed thereon. As a result, the side face 96 of the upper layer 93 becomes a tapered side face.

For the second etching process, a gaseous mixture of $CF_4$ (carbon tetrafluoride: flon 14) and $O_2$ is used as an etching gas. $CF_4$ gas has an effect of increasing the etching rate of TiN (and Ti), whereas $O_2$ gas has an effect of increasing the etching rate of the resist 81. In other words, in the etching gas, the etching rate of the upper layer 93 is increased if the mixing ratio of $CF_4$ is high, whereas the etching rate of the resist 81 is increased if the mixing ratio of $O_2$ is high. Therefore, by changing the mixing ratio between $CF_4$ and $O_2$ in the etching gas, the ratio between the etching rates of the resist 81 and the upper layer 93 can be arbitrarily adjusted. As a result, as compared to the case where $Cl_2$ gas is used for the second etching process, slopes having a tilting angle of 20° or less with respect to the substrate plane can be easily formed on the upper layer 93.

Moreover, although TiN is easily etched by a gaseous mixture of $CF_4$ and $O_2$, Al is hardly etched. Therefore, it is easy to stop the etching-based removal of the Cs metal layer 56 at the upper face of the intermediate layer 92, thus making it possible to easily shape the upper layer 93 into a desired shape. Note that the etching gas is not limited to what is mentioned above; it is also possible to use a gaseous mixture of other fluorine-type gases such as $CHF_3$, $C_2F_6$, $SF_6$ and oxygen $O_2$.

Conventionally, in the case where the Cs metal layer 56 is made only of Al, $Cl_2$ is used as an etching gas, for example. However, since $Cl_2$ can hardly remove the resist, it has been difficult for this method to confer a gentle tilt to the side face of the Cs metal layer 56. In the present embodiment, the Cs metal layer 56 is composed of the aforementioned three layers, and a gaseous mixture of $CF_4$ (carbon tetrafluoride: flon 14) and $O_2$ is used as the etching gas. Therefore, a slope having a small tilting angle can be easily formed, only on the upper layer 93 of the Cs metal layer 56.

The remaining resist 80 and 81 is removed after the etching process is finished, whereby the Cs metal layer 56 shown in FIG. 11(a) and the gate metal layer 54 shown in FIG. 11(b) are formed. Although FIGS. 12(a) to (d) illustrate the side face 76 of the gate metal layer 54 as a face which is perpendicular to the substrate plane, in actuality, the side face 76 is formed as a face which is not completely perpendicular but is slightly tilted. However, since the gate metal layer 54 and the Cs metal layer 56 are formed as described above, the tilting angle of the side face 76 of the gate metal layer 54 is larger than the tilting angle of the side face 96 of the upper layer 93 of the Cs metal layer 56.

Effects similar to the effects which are described in Embodiment 1 are also obtained in Embodiment 2.

Embodiment 3

Next, a third embodiment of the liquid crystal display device according to the present invention will be described. The liquid crystal display device of the present embodiment differs from Embodiment 2 only with respect to the construction of the reflection section 30, and is identical to Embodiment 2 except for the portions described below. Any constituent element that is identical to a constituent element of Embodiment 2 is denoted by the same reference numeral, and the detailed description thereof is omitted.

Figure 13:
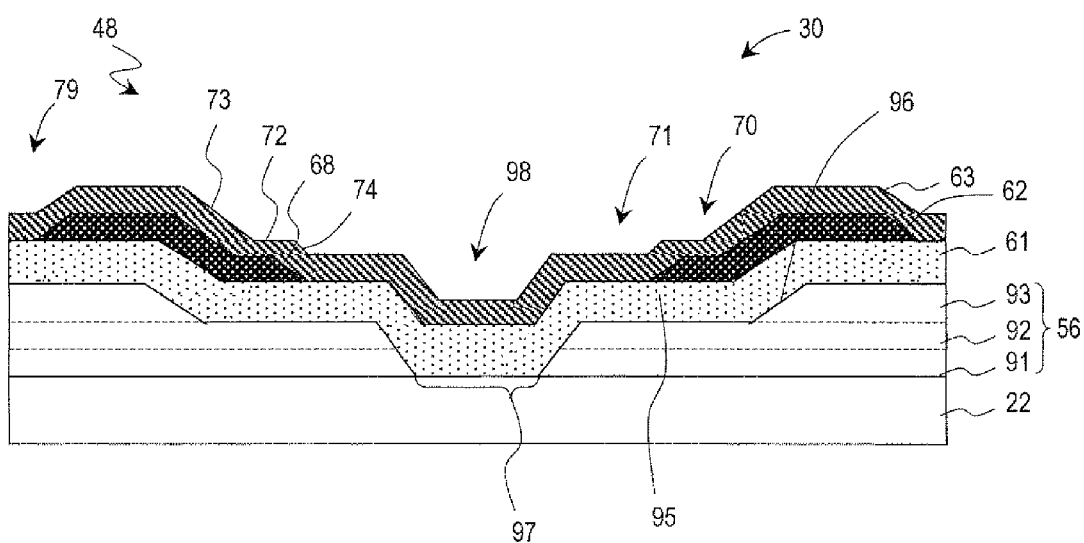
FIG. 13 A cross-sectional view showing the construction of a reflection section of Embodiment 3.

FIG. 13 shows a cross section of a recess 48 in the reflection section 30 of Embodiment 3 (cross section of the portion indicated by arrow B in FIG. 2(b)). As shown in the figure, in the Cs metal layer 56 in the reflection section 30, an aperture 97 through the lower layer 91 and the intermediate layer 92 is formed, inside the aperture 95 of the upper layer 93. Note that, in the case where the Cs metal layer 56 does not include the lower layer 91, the aperture 97 is formed as an aperture of the intermediate layer 92.

On the surface of the reflective layer 63, the recess 70, the recess 71, and a recess 98 are formed. The recess 98 is a dent which is formed inside the recess 71 in accordance with the aperture 97. On the surface of the reflective layer 63 inside the recess 71 but outside the recess 98, a flat surface which is generally parallel to the plane of the transparent substrate 22 is formed. The side face of the recess 98 is formed correspondingly to the side face of the aperture 97, a bottom face which is generally parallel to the plane of the transparent substrate 22 is formed inside the recess 98.

Figure 14:
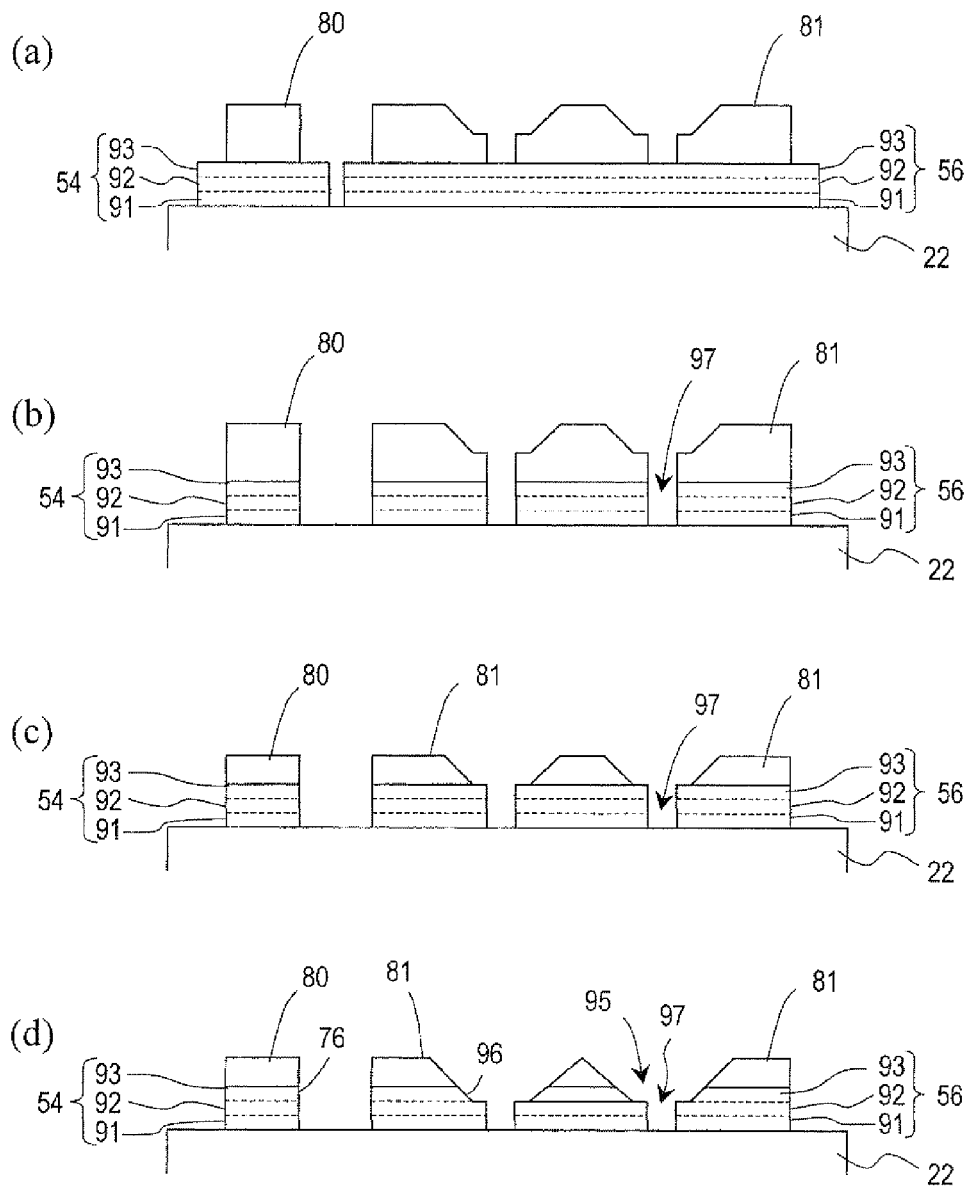
FIG. 14 Cross-sectional views showing a production method for a Cs metal layer of Embodiment 3.

FIG. 14 is a cross-sectional view showing methods for forming the gate metal layer 54 and the Cs metal layer 56 according to Embodiment 3. In this figure, for facility of description, the gate metal layer 54 and the Cs metal layer 56 are illustrated as being closer than they actually are. Moreover, only two apertures 95 of the upper layer 93 of the Cs metal layer 56 are shown.

First, as shown in FIG. 14(a), on the unpatterned gate metal layer 54 and Cs metal layer 56 formed on the transparent substrate 22, a resist 80 and 81 of e.g. a positive type is applied. Therefore, a mask pattern is transferred to the resist 80 and 81 via exposure.

A "usual exposure" is performed for the resist 80 on the gate metal layer 54, whereas a "halftone exposure" is performed for the resist 81 on the Cs metal layer 56. After transfer of the pattern via exposure, removal of the resist and cleaning are performed, whereby resist 80 and 81 as shown in FIG. 14(a) is formed on the gate metal layer 54 and the Cs metal layer 56. A dent for forming the aperture 95 in the upper layer 93 of the Cs metal layer 56 is formed in the resist 81. In this dent, an opening for forming the aperture 97 in the lower layer 91 and the intermediate layer 92 is formed.

Next, a first etching process is performed, whereby the portions of the gate metal layer 54 and the Cs metal layer 56 that are not covered by the resist 80 and 81 are removed, as shown in FIG. 14(b). At this time, the Cs metal layer located under the opening in the resist 81 is also removed, whereby the aperture 97 is formed. As an etching gas, $Cl_2$ (chlorine) is used, for example.

Next, an ashing treatment using oxygen ($O_2$) gas or the like is performed, whereby upper portions of the resist 80 and 81 are removed. As a result, resist in shapes as shown in FIG. 14(c) is left. The remaining resist 80 has a uniform thickness upon the gate metal layer 54. The remaining resist 81 has a tapered cross section as shown in the figure, such that the upper layer 93 of the Cs metal layer 56 is exposed around the aperture 97.

Thereafter, a second etching process is performed, whereby the gate metal layer 54 and the Cs metal layer 56 in shapes as shown in FIG. 14(d) are formed. Since the gate metal layer 54 was covered with the resist 80 having a uniform thickness before being etched, the side face 76 thereof is formed substantially perpendicularly to the substrate. On the other hand, the resist 81 having a tapered cross section, which was formed on the Cs metal layer 56, loses its thin portions through the etching. The upper layer 93 of the Cs metal layer 56 under the eliminated resist 81 is removed, down to a depth which is substantially in inverse proportion to the thickness of the resist 81 formed thereon. As a result, the side face 96 of the upper layer 93 becomes a tapered side face.

For the second etching process, a gaseous mixture of $CF_4$ (carbon tetrafluoride: flon 14) and $O_2$ is used as an etching gas. $CF_4$ gas has an effect of increasing the etching rate of TiN, whereas $O_2$ gas has an effect of increasing the etching rate of the resist 81. Therefore, by changing the mixing ratio between $CF_4$ and $O_2$ in the etching gas, the ratio between the etching rates of the resist 81 and the TiN (upper layer 93) can be changed arbitrarily. Thus, as compared to the case where $Cl_2$ gas is used for the second etching process, slopes having a tilting angle of 20° or less with respect to the substrate plane can be easily formed on the upper layer 93. Moreover, as has been described in Embodiment 2, use of this etching gas makes it possible to only etch the upper layer 93 and easily stop etching at the surface of the intermediate layer 92.

The remaining resist 80 and 81 is removed after the etching process is finished, whereby the Cs metal layer 56 shown in FIG. 13 and the gate metal layer 54 shown in FIG. 11(b) are formed. Although FIGS. 14(a) to (d) illustrate the side face 76 of the gate metal layer 54 and the side face of the aperture 97 of the Cs metal layer 56 as faces which are perpendicular to the substrate plane, in actuality, these side faces are formed as faces which are not completely perpendicular but are slightly tilted. Moreover, although Embodiment 3 illustrates that the aperture 97 is formed so as to penetrate the intermediate layer 92 and the lower layer 91 of the Cs metal layer 56, a dent may be formed instead of an opening, by leaving part of these layers. In this case, the recess 98 is formed on the surface of the reflective layer 63 in accordance with this dent.

According to Embodiment 3, effects similar to those of Embodiment 1 can be obtained. Since more effective reflection surfaces can be formed on the reflective layer, a superior reflection efficiency to that of Embodiment 1 can be obtained.

Embodiment 4

Next, a fourth embodiment of the liquid crystal display device according to the present invention will be described. The liquid crystal display device of the present embodiment differs from the above-described Embodiments only with respect to the construction of the gate metal layer 54, the Cs metal layer 56, and the reflection section 30, and its construction is identical to the above-described Embodiments except for the portions described below. Any constituent element that is identical to a constituent element of the above-described Embodiments is denoted by the same reference numeral, and the detailed description thereof is omitted.

Figure 15:
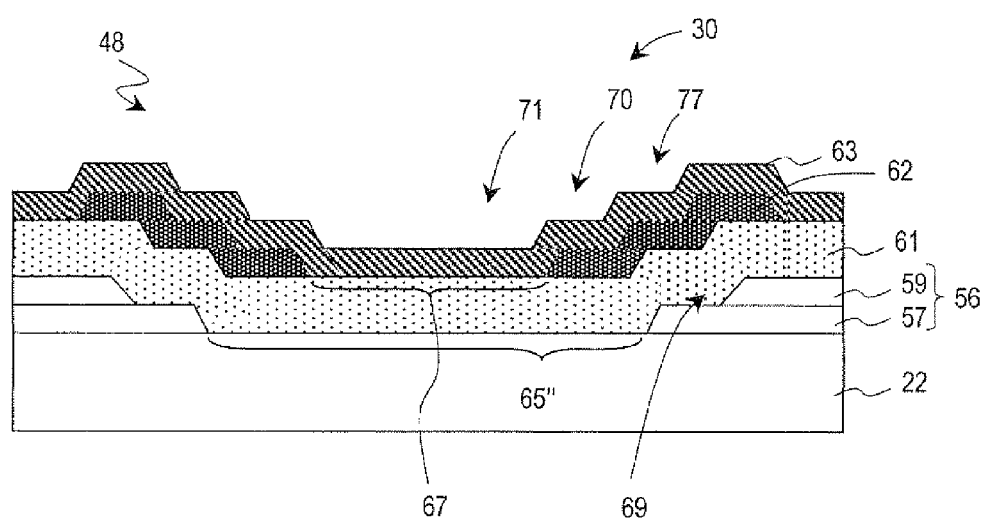
FIG. 15 A cross-sectional view showing the construction of a reflection section of Embodiment 4.

FIG. 15 shows a cross section of a recess 48 in the reflection section 30 of Embodiment 4 (cross section of the portion indicated by arrow B in FIG. 2(b)). As shown in the figure, the Cs metal layer 56 in the reflection section 30 is composed of a first metal layer 57 and a second metal layer 59 which is formed on the first metal layer 57. The first metal layer 57 is made of aluminum (Al), for example, whereas the second metal layer 59 is made of molybdenum (Mo), for example. Although omitted from illustration in the figure, the gate metal layer 54 in the TFT section 32 also has a multilayer structure of the first metal layer 57 and the second metal layer 59.

The first metal layer 57 has an aperture 65", and the second metal layer 59 has an aperture 69. The aperture 65" is formed inside the aperture 69. On the surface of the reflective layer 63, the recess 71, the recess 70, and the recess 77 are formed, these recesses being dents which are formed in accordance with, respectively, the aperture 67 in the semiconductor layer 62, the aperture 65" in the first metal layer 57, and the aperture 69 in the second metal layer 59. Note that, the aperture 67 does not need to be formed in the semiconductor layer 62, in which case the recess 71 is not formed on the surface of the reflective layer 63, but double dents with the recess 70 and the recess 77 are formed.

FIG. 16 is a cross-sectional view showing a method for forming the Cs metal layer 56 of Embodiment 4.

First, as shown in FIG. 16(a), the first metal layer 57 and the second metal layer 59 are stacked on the transparent substrate 22. The thickness of the first metal layer 57 is 50 nm, for example, whereas the thickness of the second metal layer 59 is 200 nm, for example.

Next, resist of e.g. a positive type is applied onto the second metal layer 59, and a mask pattern is transferred to the resist via a "usual exposure". Note that a "halftone exposure" may be used for the exposure, similarly to Embodiment 1. After transfer of the pattern, removal of the resist and cleaning are performed, whereby resist 85 as shown in FIG. 16(b) is formed on the second metal layer 59. Herein, an opening for forming the apertures in the first metal layer 57 and the second metal layer 59 is formed in the resist 85.

Next, an etching process is performed, whereby the portions of the first metal layer 57 and the second metal layer 59 that are not covered by the resist 85 are removed, as shown in FIG. 16(c). As the etchant here, an etchant containing e.g. 30 weight % of phosphoric acid, 25 weight % of nitric acid, 5 weight % of acetic acid, and 40 weight % of water is used. By using such an etchant, the etching rate of the second metal layer 59 can be made higher than the etching rate of the first metal layer 57. As a result, a slope in the form of stairs is formed such that the side face of the second metal layer 59 is withdrawn from the side face of the first metal layer 57.

Thereafter, the remaining resist 85 is removed, whereby formation of the aperture 65" in the first metal layer 57 and the aperture 69 in the second metal layer 59 is completed, as shown in FIG. 16(d).

During the above-described step of forming the Cs metal layer 56, the gate metal layer 54 is concurrently formed through a similar method. The fabrication according to the present embodiment is identical to that described in Embodiment 1 except for the method of forming the Cs metal layer 56 and the gate metal layer 54, and the descriptions thereof are omitted.

According to Embodiment 4, effects similar to those of Embodiment 1 can be obtained. Since more effective reflection surfaces can be formed on the reflective layer, a superior reflection efficiency to that of Embodiment 1 can be obtained.

Embodiment 5

Next, a fifth embodiment of the liquid crystal display device according to the present invention will be described. The liquid crystal display device of the present embodiment differs from the above-described Embodiments only with respect to the construction of the gate metal layer 54, the Cs metal layer 56, and the reflection section 30, and its construction is identical to the above-described Embodiments except for the portions described below. Any constituent element that is identical to a constituent element of the above-described Embodiments is denoted by the same reference numeral, and the detailed description thereof is omitted.

Figure 17:
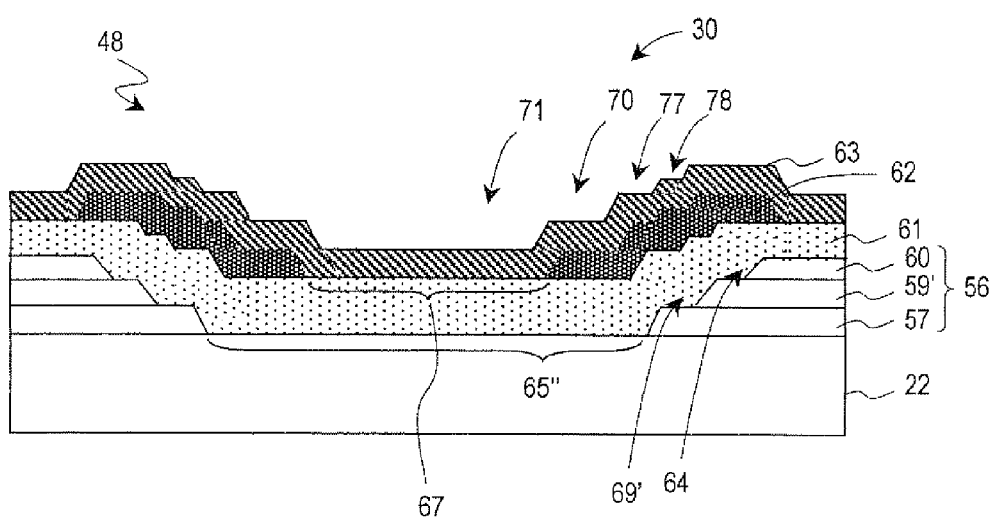
FIG. 17 A cross-sectional view showing the construction of a reflection section of Embodiment 5.

FIG. 17 shows a cross section of a recess 48 in the reflection section 30 of Embodiment 5 (cross section of the portion indicated by arrow B in FIG. 2(b)). As shown in the figure, the Cs metal layer 56 in the reflection section 30 is composed of a first metal layer 57, a second metal layer 59' formed on the first metal layer 57, and a third metal layer 60 formed on the second metal layer 59'. The first metal layer 57 is made of aluminum (Al), for example; the second metal layer 59' is made of molybdenum nitride (MoN) having 20% nitrogen content, for example; and the third metal layer 60 is made of molybdenum (Mo), for example. Although omitted from illustration in the figure, the gate metal layer 54 in the TFT section 32 also has a multilayer structure of the first metal layer 57, the second metal layer 59', and the third metal layer 60.

The first metal layer 57 has an aperture 65"; the second metal layer 59' has an aperture 69'; and the third metal layer 60 has an aperture 64. The aperture 65" is formed inside the aperture 69', and the aperture 69' is formed inside the aperture 64. A recess 71, a recess 70, a recess 77, and a recess 78 are formed on the surface of the reflective layer 63, these recesses being dents which are formed in accordance with, respectively, the aperture 67 in the semiconductor layer 62, the aperture 65" in the first metal layer 57, the aperture 69' in the second metal layer 59', and the aperture 64 in the third metal layer 60. Note that the aperture 67 does not need to be formed in the semiconductor layer 62, in which case the recess 71 is not formed on the surface of the reflective layer 63, but triple dents with the recess 70, the recess 77, and the recess 78 are formed.

FIG. 18 is a cross-sectional view showing a method for forming the Cs metal layer 56 of Embodiment 5.

First, as shown in FIG. 18(a), the first metal layer 57, the second metal layer 59', and the third metal layer 60 are stacked on the transparent substrate 22. The thickness of the first metal layer 57 is 50 nm, for example; the thickness of the second metal layer 59' is 50 nm, for example; and the thickness of the third metal layer 60 is 200 nm, for example.

Next, resist of e.g. a positive type is applied onto the third metal layer 60, and a mask pattern is transferred to the resist via a "usual exposure". Note that a "halftone exposure" may be used for the exposure, similarly to Embodiment 1. After transfer of the pattern, removal of the resist and cleaning are performed, whereby resist 85 as shown in FIG. 18(b) is formed on the third metal layer 60. Herein, an opening for forming the apertures in the first metal layer 57, the second metal layer 59', and the third metal layer 60 is formed in the resist 85.

Next, an etching process is performed, whereby the portions of the first metal layer 57, the second metal layer 59', and the third metal layer 60 that are not covered by the resist 85 are removed, as shown in FIG. 18(c). As the etchant here, an etchant containing e.g. 30 weight % of phosphoric acid, 25 weight % of nitric acid, 5 weight % of acetic acid, and 40 weight % of water is used. By using such an etchant, the etching rate of the third metal layer 60 can be made higher than the etching rate of the second metal layer 59', and the etching rate of the second metal layer 59' can be made higher than the etching rate of the first metal layer 57. As a result, a slope in the form of stairs is formed such that the side face of the third metal layer 60 is withdrawn from the side face of the second metal layer 59' and that the side face of the second metal layer 59' is withdrawn from the side face of the first metal layer 57.

Thereafter, the remaining resist 85 is removed, whereby formation of the aperture 65" in the first metal layer 57, the aperture 69' in the second metal layer 59', and the aperture 64 in the third metal layer is completed, as shown in FIG. 18(d).

During the above-described step of forming the Cs metal layer 56, the gate metal layer 54 is concurrently formed through a similar method. The fabrication according to the present embodiment is identical to that described in Embodiment 1 except for the method of forming the Cs metal layer 56 and the gate metal layer 54 and the descriptions thereof are omitted.

According to Embodiment 5, effects similar to those of Embodiment 1 can be obtained. Since more effective reflection surfaces can be formed on the reflective layer, a superior reflection efficiency to those of Embodiment 1 and Embodiment 4 can also be obtained.

Embodiment 6

Next, a sixth embodiment of the liquid crystal display device according to the present invention will be described. The liquid crystal display device of the present embodiment differs from Embodiment 1 only with respect to the material of the gate metal layer 54 and the Cs metal layer 56, and its construction is identical to Embodiment 1 except for the portions described below. Any constituent element that is identical to a constituent element of Embodiment 1 is denoted by the same reference numeral, and the detailed description thereof is omitted.

Figure 19:
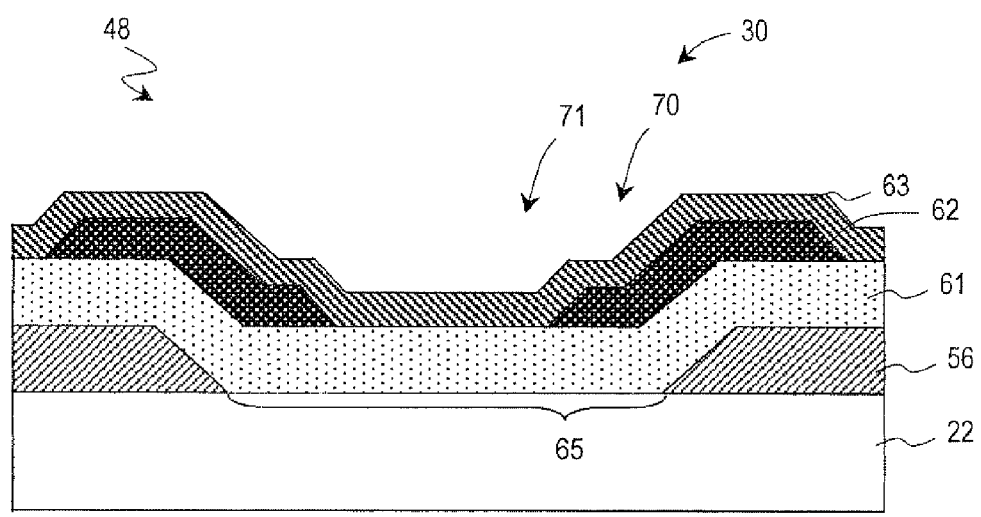
FIG. 19 A cross-sectional view showing the construction of a reflection section of Embodiment 6.

FIG. 19 shows a cross section of a recess 48 in the reflection section 30 of Embodiment 6 (cross section of the portion indicated by arrow B in FIG. 2(b)). As shown in the figure, the reflection section 30 has the same construction as in Embodiment 1. However, although the Cs metal layer 56 is made of molybdenum nitride (MoN), the nitrogen content in molybdenum nitride gradually decreases toward the gate insulating layer 61 and away from the transparent substrate 22 side. The nitrogen content is 25% in the portion adjoining the transparent substrate 22, for example, and 0% in the portion adjoining the gate insulating layer 61. In this case, the material of the portion adjoining the gate insulating layer 61 is molybdenum, but this is also said to be molybdenum nitride with 0% nitrogen content herein. Although omitted from illustration in the figure, the gate metal layer 54 in the TFT section 32 is also made of a similar molybdenum nitride.

FIG. 20 is a cross-sectional view showing a method for forming the Cs metal layer 56 of Embodiment 6.

First, as shown in FIG. 20(a), the Cs metal layer 56 of molybdenum nitride (MoN) is stacked on the transparent substrate 22 by sputtering, for example. Herein, the Cs metal layer 56 is stacked so that the nitrogen content in the molybdenum nitride gradually decreases from the transparent substrate 22 side toward the upper portion, as mentioned above. In other words, during the stacking of the Cs metal layer 56, the nitrogen content in the molybdenum nitride is decreased over time. The thickness of the Cs metal layer 56 is 300 nm, for example.

Next, resist of e.g. a positive type is applied onto the Cs metal layer 56, and a mask pattern is transferred to the resist via a "usual exposure". Note that a "halftone exposure" may be used for the exposure, similarly to Embodiment 1. After transfer of the pattern, removal of the resist and cleaning are performed, whereby resist 85 as shown in FIG. 20(*b*) is formed on the Cs metal layer 56. Herein, an opening for forming an aperture in the Cs metal layer 56 is formed in the resist 85.

Next, an etching process is performed, whereby the portions of the Cs metal layer 56 that are not covered by the resist 85 are removed, as shown in FIG. 20(*c*). As the etchant here, an etchant containing e.g. 30 weight % of phosphoric acid, 25 weight % of nitric acid, 5 weight % of acetic acid, and 40 weight % of water is used. By using such an etchant, the etching rate of the Cs metal layer 56 can be gradually increased from the lower portion toward the upper portion. Therefore, on the side face of the Cs metal layer 56, a slope having a tilt of 20 degrees or less with respect to the substrate plane is formed, which is gradually more withdrawn towards the upper portion than in the lower portion.

Thereafter, the remaining resist 85 is removed, whereby formation of the aperture 65 in the Cs metal layer 56 is completed as shown in FIG. 20(*d*).

During the above-described step of forming the Cs metal layer 56, the gate metal layer 54 is concurrently formed through a similar method. The fabrication according to the present embodiment is identical to that described in Embodiment 1 except for the method of forming the Cs metal layer 56 and the gate metal layer 54, and the descriptions thereof are omitted.

According to Embodiment 6, effects similar to those of Embodiment 1 can be obtained. Since substantially all of the slope of the Cs metal layer 56 can be made into an effective reflection surface, a superior reflection efficiency to that of Embodiment 1 can also be obtained.

Embodiment 7

Hereinafter, a seventh embodiment of the liquid crystal display device according to the present invention will be described with reference to the drawings. Note that the same reference numerals are attached to those constituent elements which are identical to the constituent elements in Embodiments 1 to 6, and the descriptions thereof are omitted.

Figure 21:
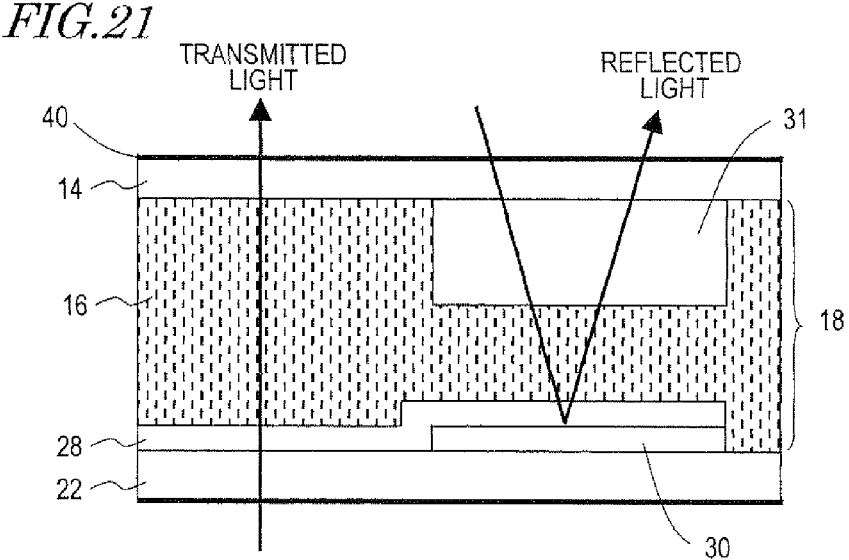
FIG. 21 A cross-sectional view showing a liquid crystal display device of Embodiment 7.

FIG. 21 is a diagram schematically showing a cross-sectional shape of the liquid crystal display device of the present embodiment. This liquid crystal display device is based on the liquid crystal display devices of Embodiments 1 to 6 from which the interlayer insulating layer 26 is excluded, and is identical to the liquid crystal display devices of Embodiments 1 to 6 except for the points discussed below. Note that, in FIG. 21, the detailed structure of the counter substrate 14 and the TFT section 32 are omitted from illustration.

As shown in the figure, in the liquid crystal display device of the present embodiment, no interlayer insulating layer is formed, and therefore the pixel electrode 28 is formed upon the reflective layer 63 in the reflection section 30 and in the TFT section 32, via an insulating film not shown. The structure and production method for the reflection section 30 and the TFT section 32 are the same as those of the liquid crystal display devices of Embodiments 1 to 6 except that the interlayer insulating layer 26 is eliminated. The pixel layout and wiring structure in the liquid crystal display device are also similar to what is shown in FIG. 2(*a*).

Also with this construction, as in Embodiments 1 to 6, the effective reflection surfaces of the reflective layer 63 are expanded in area, so that more light can be reflected toward the display surface 40.

Embodiments 1 to 7 described above illustrate that the recess 71 and the recesses 70, 77, and 78 which are formed on the surface of the reflective layer 63 in the reflection section 30 are in the shapes of concentric circles as seen perpendicularly with respect to the substrate. However, when forming the Cs metal layer 56 and the semiconductor layer 62, the positions of these layers may be varied to dispose the recess 71 and the recesses 70, 77, and 78 so that their centers are at respectively different positions. Moreover, the positions and sizes of the Cs metal layer 56 and the semiconductor layer 62 may be varied so that the peripheries of the recess 71 and the recess 70, 77, or 78 partly overlap, or that their peripheries intersect. In such cases, too, many ruggednesses having level differences are formed on the surface of the reflective layer 63, thus making it possible to broaden the effective reflection surfaces.

Although the above-described Embodiments illustrate that a plurality of recesses in the reflective layer are each in the shape of a circle, the shapes of the Cs metal layer 56 and the semiconductor layer 62 may be changed so that some or all of the plurality of recesses are formed into various shapes, e.g., ellipses, polygons such as triangles or quadrangles, recesses with sawtoothed edges, or combinations thereof. Moreover, the shape of one recess and the shape of the other recess may be differed, and their peripheries may be formed to partly overlap or intersect. In such cases, too, many ruggednesses having level differences are formed on the surface of the reflective layer 63, thus making it possible to broaden the effective reflection surfaces.

Although the above-described Embodiments illustrate that the apertures 67 are formed in the semiconductor layer 62, recesses may be formed instead of the apertures 67. In that case, too, a large number of recesses are formed on the surface of the reflective layer 63, whereby effects similar to the effects according to the above-described Embodiments are obtained. Moreover, the apertures 67 in the semiconductor layer 62 do not need to be formed, in which case the recesses 71 are not formed on the surface of the reflective layer 63. A liquid crystal display device with such a configuration is also encompassed by the liquid crystal display device according to the present invention.

As has been illustrated by the above Embodiments, a liquid crystal display device according to the present invention includes a large number of level differences and corner portions on the surface of a reflective layer, as well as a large number of slopes with a tilting angle of 20 degrees or less, and therefore acquires reflection regions with broad effective reflection surfaces and excellent scattering characteristics. Moreover, since the level differences and corner portions on the reflection surface are formed in accordance with the shapes of the Cs metal layer and the semiconductor layer Just when they are shaped, reflection regions having excellent reflection characteristics can be easily obtained without increasing the production steps. Therefore, a liquid crystal display device which is capable of uniform and highly-bright displaying can be provided inexpensively.

Furthermore, according to the present invention, the face of a pixel electrode facing the liquid crystal layer is formed flat, similarly to its face on the counter electrode side, and no level difference is formed in the pixel electrode near the end of the reflection section, thus making it possible to uniformly control the orientation of liquid crystal in a desired direction. Therefore, it is possible to provide a liquid crystal display device which has a high transmittance, excellent viewing angle characteristics, and little display unevenness.

The liquid crystal display device according to the present invention encompasses display apparatuses, television sets, mobile phones, etc., in which a liquid crystal panel is utilized. Moreover, although the present embodiments illustrate transflective-type liquid crystal display devices as examples, a reflection-type liquid crystal display device or the like having a similar configuration to the aforementioned reflection section would also be encompassed as one configuration of the present invention.

Since the liquid crystal display device according to the present invention is formed by the above-described production methods, it can be produced with the same materials and steps as those for a transmission-type liquid crystal display device. Therefore, at low cost, a liquid crystal display device having a reflection efficiency can be provided.

INDUSTRIAL APPLICABILITY

According to the present invention, transflective-type and reflection-type liquid crystal display devices having a high image quality can be provided at low cost. Liquid crystal display devices according to the present invention can be suitably used for transflective-type and reflection-type liquid crystal display devices which perform display by utilizing reflected light, e.g., mobile phones, onboard display device such as car navigation systems, display devices of ATMs and vending machines, etc., portable display devices, laptop PCs, and the like.

The invention claimed is:

1. A liquid crystal display device comprising:
a reflection region for reflecting incident light toward a display surface, wherein,
the reflection region includes a metal layer, an insulating layer formed on the metal layer, a semiconductor layer formed on the insulating layer, and a reflective layer formed on the semiconductor layer;
a first recess and a second recess located inside the first recess are formed on a surface of the reflective layer in the reflection region;
the metal layer has an aperture or a recess;
the semiconductor layer has an aperture;
one of the first recess and the second recess is formed according to the aperture or recess of the metal layer, and the other of the first recess and the second recess is formed according to the aperture of the semiconductor layer;
wherein the metal layer has a composition which varies along a thickness direction of the metal layer; and
wherein the metal layer is made of molybdenum nitride, and a nitrogen content in the molybdenum nitride of the metal layer decreases toward the insulating layer.

* * * * *